US006639719B2

(12) United States Patent
Tegreene et al.

(10) Patent No.: US 6,639,719 B2
(45) Date of Patent: Oct. 28, 2003

(54) SYSTEM AND METHOD FOR USING MULTIPLE BEAMS TO RESPECTIVELY SCAN MULTIPLE REGIONS OF AN IMAGE

(75) Inventors: Clarence T. Tegreene, Redmond, WA (US); John R. Lewis, Bellevue, WA (US); Hakan Urey, Redmond, WA (US)

(73) Assignee: Microvision, Inc., Bothell, WA (US)

( * ) Notice: Subject to any disclaimer, the term of this patent is extended or adjusted under 35 U.S.C. 154(b) by 0 days.

(21) Appl. No.: 09/858,712

(22) Filed: May 15, 2001

(65) Prior Publication Data

US 2002/0181097 A1 Dec. 5, 2002

(51) Int. Cl.[7] .................. G03B 21/56; G03B 21/60; G02B 27/28; G02B 5/30
(52) U.S. Cl. .................. 359/443; 359/449; 359/454; 359/459; 359/489; 359/495
(58) Field of Search .................. 359/443, 449, 359/454, 459, 484, 489, 495

(56) References Cited

U.S. PATENT DOCUMENTS

| | | |
|---|---|---|
| 3,796,999 A | 3/1974 | Kahn |
| 3,971,931 A | 7/1976 | Jehle .................. 250/214 LA |
| 4,948,957 A | 8/1990 | Rusche .................. 250/330 |
| 5,027,079 A | 6/1991 | Desurvire et al. ..... 359/341.32 |
| 5,085,506 A | 2/1992 | Kahn et al. |
| 5,206,674 A | 4/1993 | Puech et al. |
| 5,231,282 A | 7/1993 | Nishi et al. |
| 5,235,437 A * | 8/1993 | Katagiri et al. ............ 358/471 |
| 5,268,776 A | 12/1993 | Tachikawa et al. |
| 5,327,263 A * | 7/1994 | Katagiri et al. ............ 358/471 |
| 5,355,181 A | 10/1994 | Ashizaki et al. ............ 348/744 |
| 5,420,414 A | 5/1995 | Wentworth ................ 250/216 |
| 5,467,104 A | 11/1995 | Furness, III et al. ............ 345/8 |
| 5,543,968 A | 8/1996 | Freeman et al. ............ 359/631 |
| 5,557,444 A | 9/1996 | Melville et al. ............ 359/199 |
| 5,567,937 A | 10/1996 | Pinkus .................. 250/252.1 |
| 5,596,339 A | 1/1997 | Furness, III et al. ............ 345/8 |
| 5,612,753 A | 3/1997 | Poradish et al. |
| 5,629,790 A | 5/1997 | Neukermans et al. ....... 359/198 |
| 5,648,618 A | 7/1997 | Neukermans et al. .... 73/862.08 |
| 5,654,775 A | 8/1997 | Brennesholtz |
| 5,673,139 A | 9/1997 | Johnson ................ 359/291 |
| 5,687,034 A | 11/1997 | Palmer ................ 359/827 |
| 5,751,465 A | 5/1998 | Melville et al. ............ 359/213 |
| 5,907,425 A | 5/1999 | Dickensheets et al. ...... 359/224 |
| 5,929,562 A | 7/1999 | Pichler ................ 313/506 |
| 6,007,208 A | 12/1999 | Dickensheets et al. ...... 359/872 |
| 6,094,298 A | 7/2000 | Luo et al. ............ 359/346 |
| 6,140,979 A | 10/2000 | Gerhard et al. ............ 345/7 |

FOREIGN PATENT DOCUMENTS

| | | |
|---|---|---|
| EP | 0 249 326 A1 | 12/1986 |
| EP | 0 439 146 A2 | 7/1991 |
| EP | 0 663 770 A1 | 7/1995 |
| EP | 0 439 146 A3 | 7/2001 |
| JP | 01211719 | 8/1989 |
| JP | 01312593 | 12/1989 |
| JP | 04162081 | 6/1992 |
| WO | WO 01/33531 A1 | 5/2001 |

OTHER PUBLICATIONS

Sunny Baims; "Light amps hold promise for image–projection displays", EE Times, 'Online!; Feb. 22, 1999.

* cited by examiner

Primary Examiner—Russell Adams
Assistant Examiner—Magda Cruz
(74) Attorney, Agent, or Firm—Graybeal Jackson Haley LLP

(57) ABSTRACT

An image system includes a screen and a beam generator. The screen has first and second regions with adjustable brightness levels. The beam generator directs first and second electromagnetic off beams and first and second electromagnetic on beams onto the first and second regions, respectively. The first and second off beams respectively change the brightness levels of the first and second regions according to a first polarity, and the first and second on beams change the brightness levels of the first and second regions according to a second polarity. For example, the system may simultaneously scan multiple tiles of an image onto respective regions of the display screen with respective image (on) beams, and erase the regions with respective erase (off) beams. Scanning an image as multiple tiles often provides the image with a higher resolution for a given scan rate, and using on and off beams often increases the quality of the image.

17 Claims, 10 Drawing Sheets

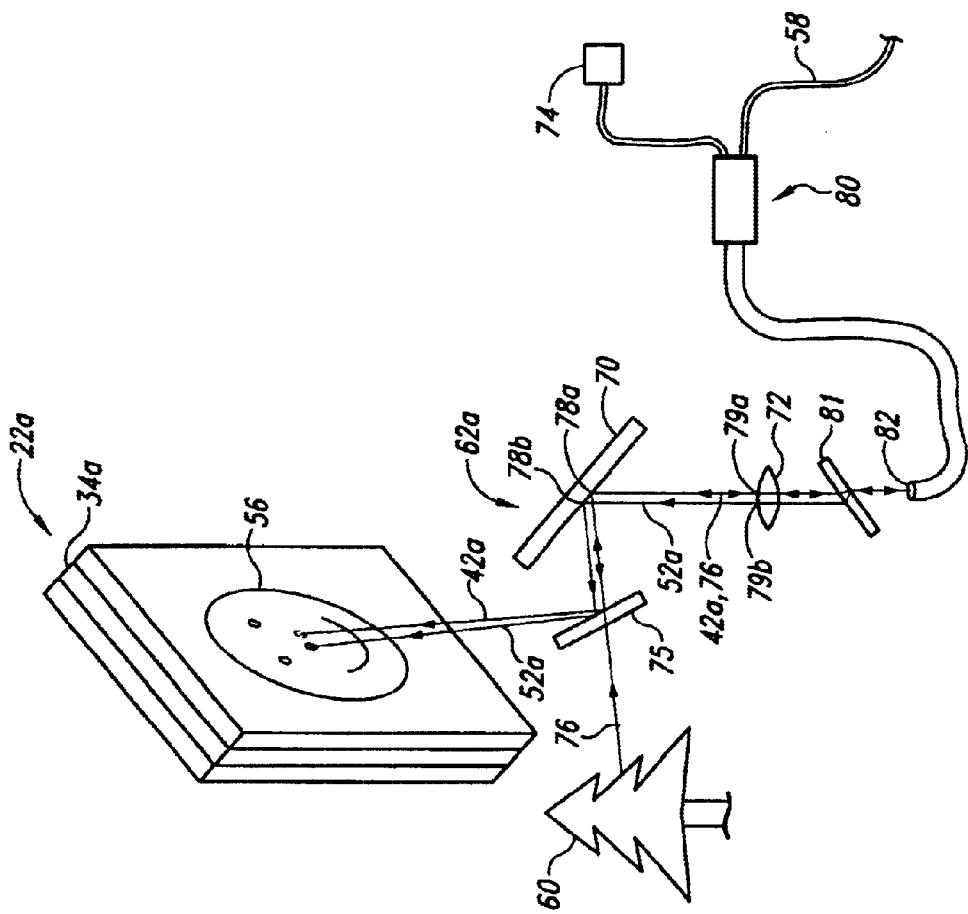
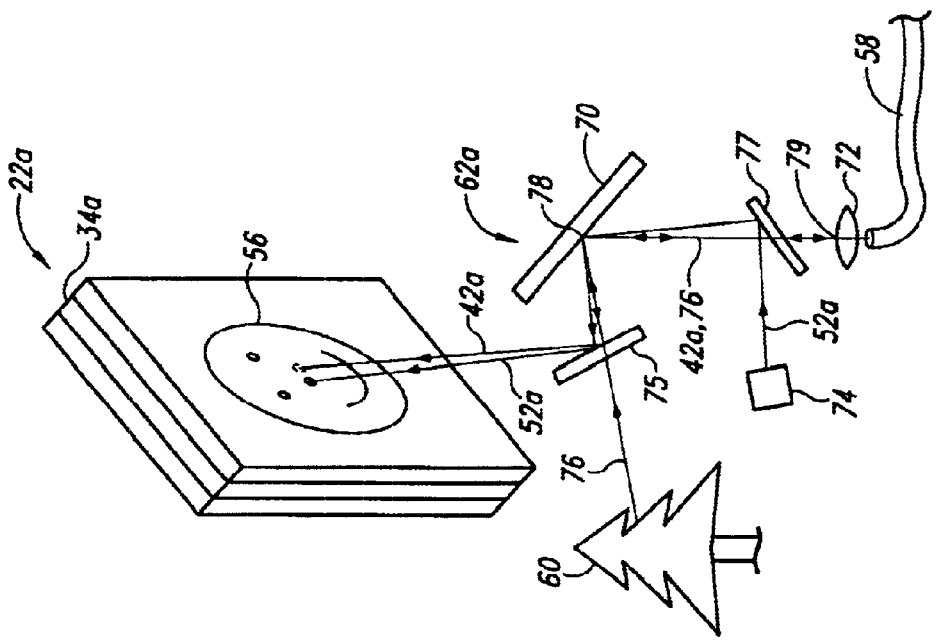
Fig. 4B
Fig. 4A

SYSTEM AND METHOD FOR USING MULTIPLE BEAMS TO RESPECTIVELY SCAN MULTIPLE REGIONS OF AN IMAGE

TECHNICAL FIELD OF THE INVENTION

The invention relates generally to optical imaging systems, and more particularly to a system and method for scanning multiple regions with respective scanning beams. For example, the system may simultaneously scan regions—often called "tiles"—of an image onto a display screen with respective image (on) beams. Scanning an image as multiple tiles often provides the image with a higher resolution for a given scan rate.

BACKGROUND OF THE INVENTION

Imaging-system manufactures strive to develop reasonably priced imaging systems that provide high-quality, high-resolution images. For example, manufacturers strive to develop reasonably priced image-capture or -display systems that can scan high-resolution images.

But increasing the resolution of a scanned image often requires increasing the image scan rate, which often requires increasing the complexity, and thus the cost, of an image-capture or -display system.

Therefore, engineers have developed "tiling" image systems that separately scan respective regions, i.e., tiles, of an image. Thus, for a given scan rate, a tiling system often provides images having a higher resolution than a non-tiling system.

Unfortunately, tiling image systems may capture or display images that are dim, have uneven brightness, or have other artifacts that reduce the quality of the captured or displayed images.

OVERVIEW OF IMAGE-DISPLAY DEVICES AND TECHNIQUES

A variety of image-display/image-projection devices and techniques are available for visually displaying/projecting graphical or video images—often called video frames—to a viewer. Typically, a graphical image is an image that changes slowly or not at all. For example, a flight-instrument graphic is an image of cockpit instruments that overlays a pilot's view. This graphic may be projected onto a viewing area such as the windshield or may be projected directly into the pilot's eyes such that he/she sees the flight instruments regardless of his/her viewing direction. There is typically little change in this graphic other than the movement of the instrument pointers or numbers. Conversely, video frames are a series of images that typically change frequently to show movement of an object. For example, a television set displays video frames.

A cathode-ray-tube (CRT) display, such as used in a television or a computer monitor, is a common image-display/image-projection device that, unfortunately, has several limitations. For example, a CRT is typically bulky and consumes a significant amount of power, thus making it undesirable for many portable or head-mounted applications.

Flat-panel displays, such as liquid-crystal displays (LCDs), organic LEDs, plasma displays, and field-emission displays (FEDs), are typically less bulky and consume significantly less power than a CRT having a comparable viewing area. But, flat panel displays often lack sufficient luminance and adequate color purity and/or resolution for many head-mounted applications.

A common problem with both CRTs and flat-panel displays is that the displayed/projected image may include visible artifacts that are introduced into the image during the capturing, processing, or displaying of the image. Typically, an image-capture device such as a vidicon tube or charge-coupled device (CCD) captures an image of an object by converting light reflected by the object into electrical signals. A display/projection system that includes one of the aforementioned display/projection devices receives these electrical signals and processes them. The display/projection device converts these processed electrical signals into an array of pixels, which a viewer perceives as an image of the object. Unfortunately, visible errors and degradations, often called artifacts, may be introduced into the image during the conversion of the reflected light into electrical signals, during the processing of the electrical signals, or during the converting of the electrical signals into pixels.

Recently, engineers have developed an image amplifier that can display an image or project the image onto a display screen. Typically, an image amplifier is less complex, less expensive, and can be made smaller than a CRT or flat-panel display, and an image-amplifier display system typically uses significantly less power than a CRT or flat-panel display system. Furthermore, because it does not necessarily convert light into electrical signals and back again, an image-amplifier display system typically introduces fewer artifacts into an image.

FIG. 1 is a perspective view of a conventional image-amplifier display system 20 that includes an image amplifier 22, an illuminator 24, and an image generator 26. For example, the image amplifier 22 may be a Light Smith, which was developed by Simac Company of Boise, Id. Although, as discussed above, the system 20 is often less complex, cheaper, and smaller than a CRT or flat-panel display system, it can display/project a relatively bright and high-quality image 28.

The image amplifier 22 of the system 20 includes transparent front and back electrodes 30 and 32 and a display/projection screen 34 having a display/projection surface 36 and a scan surface 38. An electric-field generator (not shown) is coupled to the electrodes 30 and 32 and generates an electric field across the screen 34. This electric field allows the image generator 26 to set the brightness levels—here the reflectivity levels—of the regions of the display/projection surface 36 such that the generator 26 can generate bright and dark pixels of an image. For example, the generator 26 can set the reflectivity of the region 44 on the surface 36 to a relatively high level such that the region 44 reflects a relatively high percentage of the incident light from the illuminator 24. Therefore, in this example, the pixel of the image 28 corresponding to the region 44 is a relatively bright pixel.

The illuminator 24 typically includes an incoherent light source such as an incandescent bulb (not shown), which illuminates the display/projection surface 36 of the screen 34. The surface 36 reflects the light from the illuminator 24 according to the reflectivity of each region 44 to display the image 28—that is, project the image 28 directly into a viewer's (not shown) eye—or to project the image 28 onto a display screen 46 through an optical train 47, which is represented by a lens.

The image generator 26 generates the image 28 on the display/projection surface 36 of the screen 34 by erasing the surface 36 with an electromagnetic erase burst 40 and then scanning an image beam 42 across the scan surface 38.

More specifically, erasing the surface 36 of the screen 34 entails simultaneously setting all the regions 44 on the surface 36 to the same or approximately the same predetermined reflectivity level with the erase burst 40. Typically, this predetermined reflectivity level is a low reflectivity level—which represents black—although it can be any other desired reflectivity level. The erase burst 40 typically is an energy burst having a first wavelength in the visible, ultraviolet, or infrared range of the electromagnetic spectrum and is wide enough to simultaneously strike the entire scan surface 38. Where the erase level is black, the screen 34 is typically constructed such that exposing the scan surface 38 to this first wavelength reduces the reflectivity levels of the regions 44. Because these reflectivity levels may be different from one another before the erase cycle, the generator 26 generates the burst 40 long enough to reduce the reflectivity levels of all the regions 44 to the black level regardless of their pre-erase reflectivity levels. Furthermore, because it typically "turns off" the reflectivities of the regions 44, the burst 40 is sometimes called an "off" burst.

Generating the image 28 on the screen 34 entails scanning the image beam 42 across the scan surface 38 to set the reflectivity levels of the regions 44 such that the reflectivity levels correspond to the brightness levels of the respective pixels of the image 28. The beam 42 typically is an energy beam having a second wavelength in the visible, ultraviolet, or infrared range of the electromagnetic spectrum and has a diameter that equals or approximately equals the diameter of a region 44. Typically, one can set the diameter of the beam 42—and thus the diameter of each region 44—small enough so that the image amplifier 22 provides a high-resolution, high-quality image 28. Where the erase level is black, the screen 34 is typically constructed such that exposing the scan surface 38 to this second wavelength increases the reflectivity levels of the regions 44. The image generator 26 sets the reflectivity level of a region 44 by modulating the time that the image beam 42 strikes the region of the scan surface 38 corresponding to the region 44, by modulating the intensity of the beam 42 as it strikes the corresponding region of the surface 38, or by modulating both the intensity and time. The generator 26 can modulate the intensity of the beam 42 by modulating the power to the beam source (not shown) or with an acoustic-optic modulating crystal (not shown) in the path of the beam 42. Because the reflectivity level of a region 44 starts out at a known level—black for example—the generator 26 can use a look-up table or other techniques to determine a striking time or striking intensity that will set the region 44 to the desired reflectivity level. Furthermore, because it effectively "turns on" the reflectivities of the regions 44, the beam 42 is sometimes called an "on" beam.

Still referring to FIG. 1, in operation for still images, the image generator 26 generates the erase burst 40 to erase the surface 36 of the screen 34, and then scans the image 28 onto the surface 36. Specifically, the generator 26 scans the image beam 42 across the scan surface 38 of the display screen 34 to generate the image 28 on the surface 36. In one embodiment, the persistence of the surface 36 is relatively long such that once the beam 42 scans the image 28, the screen 34 "holds" the image. "Persistence," as used in reference to FIG. 1, is the amount of time that a region 44 of the surface 36 retains the reflectivity level set by the beam 42. Therefore, if the persistence is relatively long, e.g., hours, then the generator 26 need not rescan the image 28 or may rescan the image 28 at relatively long intervals. The generator 26 may scan the beam 42 according to any number of conventional scanning techniques such as those described in U.S. Pat. No. 6,140,979, entitled "Scanned Display With Pinch, Timing, And Distortion Correction", which is incorporated by reference.

In operation, for a series of video frames, the image generator 26 generates the erase burst 40 before each frame, and then scans the image beam 42 across the surface 38 to generate the frame on the display/projection surface 36. The generator 26 then repeats this sequence—generating an erase burst 40 and then scanning the surface 38 with the beam 42—for each frame.

Unfortunately, a problem with generating video frames on a long-persistence screen 34 is uneven brightness control within frames. Specifically, if the entire region is erased, the first region 44 scanned by the image beam 42 has the desired reflectivity level for a longer time than the subsequently scanned regions, and for a significantly longer time than the last-scanned region. Therefore, the first-scanned regions 44 may appear brighter on average than the last-scanned regions. For example, assume that the image generator 26 generates the erase burst 40 every T seconds, scans a first region 44 with the image beam 42 virtually immediately after generating the erase burst 40, and generates the next erase burst 40 t seconds after scanning the last region 44. Therefore, the first-scanned region 44 has its "on" reflectivity for approximately T seconds, while the last-scanned region 44 has its "on" reflectivity for only t seconds. Consequently, because the first-scanned regions 44 tend to be "on" longer than the last-scanned regions 44, the first-scanned regions tend on average to appear brighter to the eye than the last-scanned regions 44. Thus, this may cause the image 28 to have an uneven brightness.

One approach to addressing uneven brightness is to shorten the persistence of the screen 34. For instance, referring to the above example, one can construct the screen 34 such that the regions 44 each have a persistence of approximately t seconds such that each region 44, regardless of when it is scanned by the image beam 42, has its "on" reflectivity for approximately the same time.

While this solution may reduce the appearance of uneven brightness, it will often reduce the overall brightness of the image 28, or may otherwise degrade the image 28.

SUMMARY OF THE INVENTION

One aspect of the invention is an image system that includes a screen and a beam generator. The screen has first and second regions with adjustable brightness levels. The beam generator directs first and second electromagnetic off beams and first and second electromagnetic on beams onto the first and second regions, respectively. The first and second off beams respectively change the brightness levels of the first and second regions according to a first polarity, and the first and second on beams change the brightness levels of the first and second regions according to a second polarity.

For example, such a system may simultaneously scan multiple tiles of an image onto respective regions of the display screen with respective image (on) beams, and erase the regions with respective erase (off) beams. Scanning an image as multiple tiles often provides the image with a higher resolution for a given scan rate, and using on and off beams often increases the quality of the image.

BRIEF DESCRIPTION OF THE DRAWINGS

FIG. 4A is a diagram of an image captor/generator and an image amplifier of FIG. 3 according to an embodiment of the invention.

FIG. 4B is a diagram of an image captor/generator and an image amplifier of FIG. 3 according to another embodiment of the invention.

DESCRIPTION OF THE INVENTION

Figure 1:
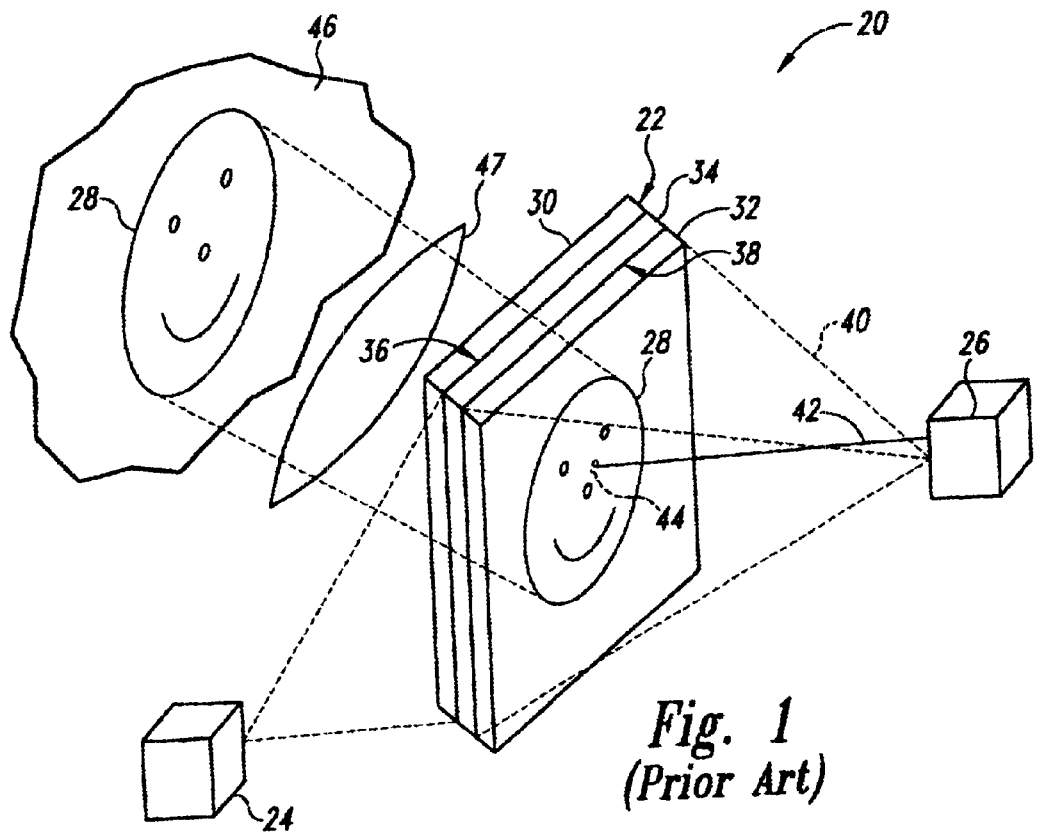
FIG. 1 is an isometric view of a conventional image-amplifier display system.
Figure 2:
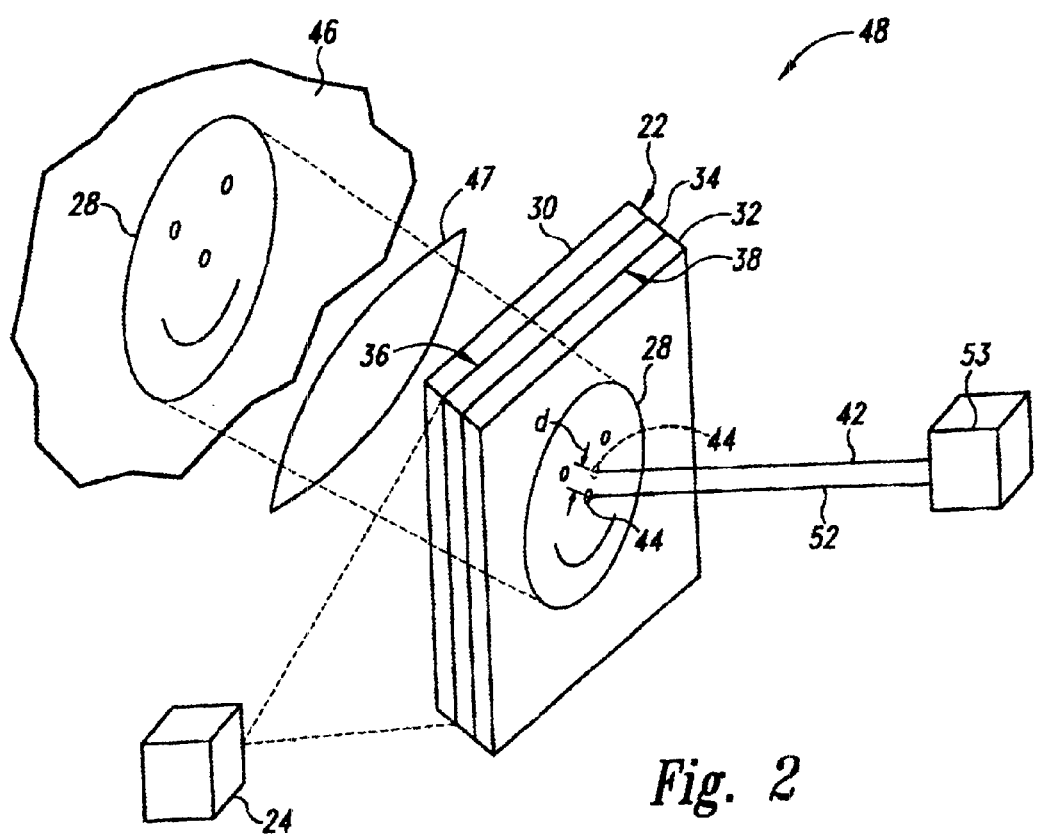
FIG. 2 is an isometric view of an image-amplifier display system according to an embodiment of the invention.

FIG. 2 is an isometric view of an image-amplifier display/projection system 48 according to an embodiment of the invention. As discussed below, the system 48 is similar to the system 20 of FIG. 1 except that it uses an erase beam 52 to erase the regions 44 instead of using the erase burst 40. Because the systems 20 and 48 are similar, components common to the systems 20 and 48 are referenced by like numerals.

The system 48 includes an image generator 53, which generates the image beam 42 and the erase beam 52. In one embodiment, the erase beam 52 has the same wavelength as the erase burst 40 of FIG. 1, and thus sets the reflectivity level of each region 44 of the display/projection surface 36 to a predetermined erase level such as black. But instead of simultaneously erasing all of the regions 44 with an erase burst, the generator 53 scans the erase beam 52 across the scanning surface 38 ahead of the image beam 42. Therefore, unlike the erase burst 40, the erase beam 52 erases one region 44 at a time. The intensity of the beam 52 is typically high enough to erase a region 44 in the time that the beam 52 strikes the region regardless of the pre-erase reflectivity level of the region. Because this striking time is proportional to the horizontal scan rate, the intensity of the erase beam 52 is typically higher for higher scan rates so that the overall energy striking the region 44 achieves the desired erase level even at higher scan rates. Furthermore, a distance d separates the image beam 42 from the erase beam 52 in the scanning direction. Typically, d is wide enough to prevent the beams 42 and 52 from interfering with one another on the display/projection screen 34. In addition, the separation between adjacent scan lines is sufficient such that the erase beam 52 does not erase any part of a previously written line. Alternatively, the erase beam may lead the image beam 42 by one or more scan lines as discussed below in conjunction with FIG. 12.

In operation, the image generator 53 scans both the image beam 42 and the erase beam 52 across the scan surface 38 of the screen 34 such that the erase beam 52 leads the image beam 42. The generator 53 may scan the beams 42 and 52 in a digital fashion by deactivating the beams in between the regions 44. Alternatively, the generator 53 may scan the beams 42 and 52 in an analog fashion by keeping the beams activated in between the regions 44.

Consequently, the erase beam 52 erases a region 44, and, shortly thereafter, the image beam 42 sets the reflectivity of the region 44 to the desired level. Therefore, for video frames, assuming that the persistence of the screen 34 is longer than the frame rate, all of the regions 44 are "on" for approximately the same amount of time. This is unlike the system 20 of FIG. 1, where the last scanned regions 44 are "on" for a significantly shorter time than the first scanned regions. For example, assume that the frame rate, which is the time between successive scans of a region 44 by the image beam 42, is T seconds, and the persistence of each region 44 is greater than T. Because the erase beam 52 leads the image beam 42 by only a relatively small distance d each region 44 is erased approximately T seconds after being turned "on" by the image beam 42. Therefore, the system 48 can achieve more brightness uniformity for a long persistence than system 20 can as that described above with reference to FIG. 1.

Although the image generator 53 is described above as simultaneously generating and scanning the image and erase beams 42 and 52 spaced apart by a distance d, in another embodiment the generator 53 scans a single beam (not shown) that toggles between the image-beam wavelength and the erase-beam wavelength. That is, the generator 53 directs this single beam onto a particular region 44. For the first period of the time that the beam strikes the region 44, the beam has the erase-beam wavelength, and for the second period of time that the beam strikes the region 44, the beam has the image-beam wavelength. The generator 53 then scans the single beam onto the next region 44.

Furthermore, techniques for scanning the beams 42 and 52 across the scan surface 38 are discussed below in conjunction with FIGS. 5–12.

Figure 3:
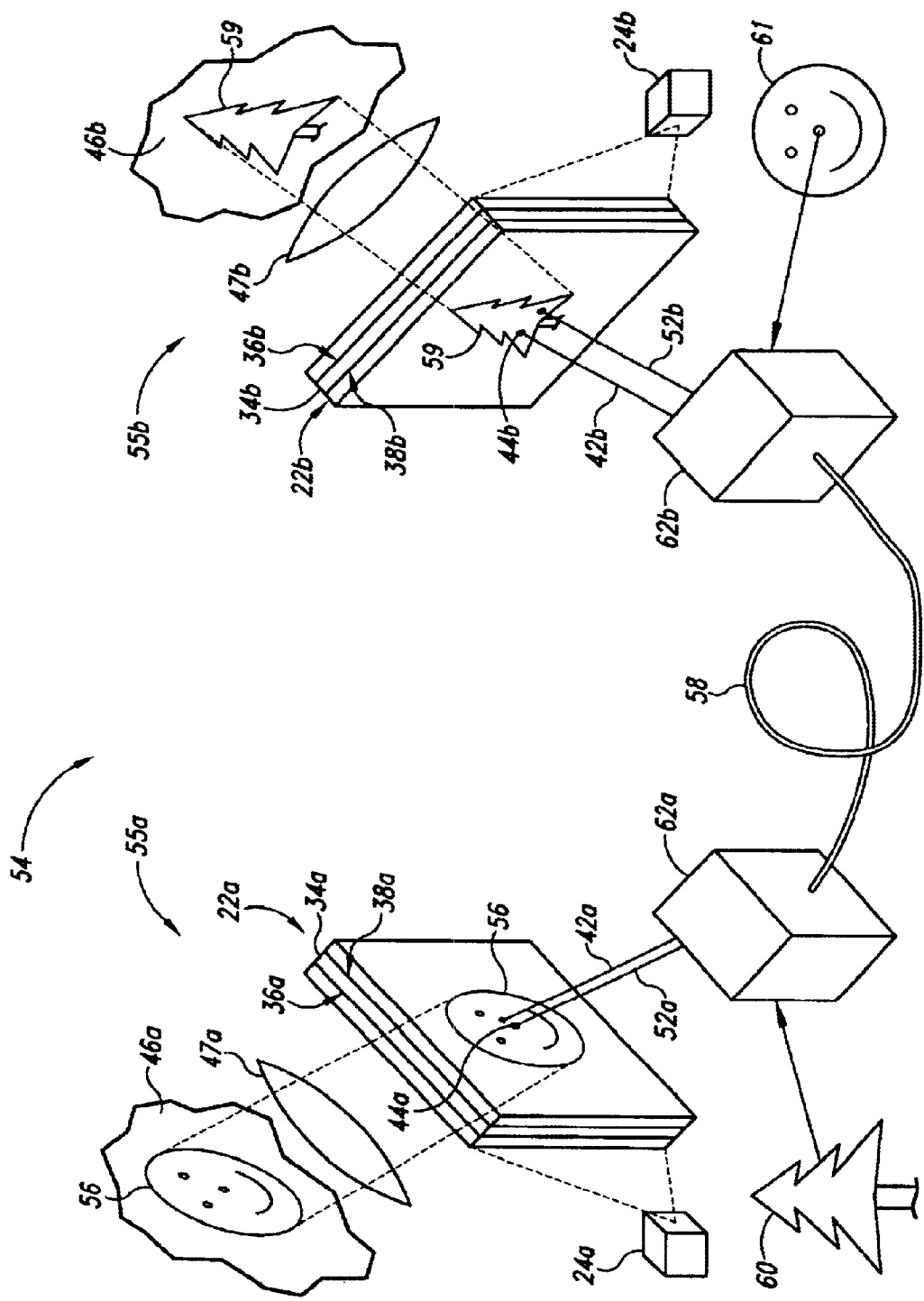
FIG. 3 is an isometric view of a linked image system that includes at least one image-amplifier display system of FIGS. 1 or 2 according to an embodiment of the invention.

FIG. 3 is a perspective view of an optical-linked imaging system 54, which includes a pair of image-display/image-capture systems 55a and 55b according to an embodiment of the invention. Because the described embodiment of the system 54 is entirely optical—it does not convert optical signals to electronic signals and back again—it may eliminate some of the disadvantages of conventional non-optical imaging systems. Prior optical-linked imaging systems are described in commonly owned U.S. patent app. Ser. No. 09/129,739, entitled "Linked Scanner Imaging System And Method", which is incorporated by reference.

The image display/projection capabilities of the systems 55a and 55b are similar to those of the system 48 of FIG. 2, but each of the systems 55a and 55b can also capture an image, a series of images, or may capture light generally from a location remote from the amplifiers 22a and 22b, respectively. The system 55a receives an image 56 from the system 55b via a fiber-optic cable 58 and scans the image 56 onto an image amplifier 22a, which displays the image 56 or projects the image 56 onto a display screen 46a through an optical train 47a. The system 55a also captures light, such as that corresponding to an image 59 of an object 60—the object 60 may be an object like a tree, or a photo or other likeness of the tree—and transmits the image 59 to the system 55b via the cable 58. Likewise, the system 55b receives the image 59 from the system 55a via the cable 58 and scans the image 59 onto an image amplifier 22b, which displays the image 59 or projects the image 59 onto a display screen 46b through an optical train 47b. The system 55b also captures the image 56 of an object 61 and transmits the image 56 to the system 55a via the cable 58.

The system 55a includes an image generator/captor 62a in addition to the image amplifier 22a, an illuminator 24a, and the display screen 46a, which are similar to the amplifier 22, the illuminator 24, and the display screen 46 of FIG. 2. The generator/captor 62a scans an image beam 42a and an erase beam 52a across the scan surface 38a of the screen 34a to generate the image 56 on the display/project surface 36a in a manner similar to that described above in conjunction with FIG. 2. The generator/captor 62a also captures the image 59 by scanning rays of light reflected from the object 60 into the cable 58 as a continuous beam of light, i.e., an optical signal, as discussed below in conjunction with FIGS. 4A and 4B. That is, the generator/captor 62a converts rays of visible light reflected from the object 60 into the optical signal, which propagates through the cable 58. The generator/captor 62a may couple the reflected light rays directly into the cable 58 as the optical signal. Or, the generator/captor 62a may conventionally convert the wavelength set of the reflected light rays into a different wavelength set, and couple this different wavelength set into the cable 58 as the optical signal. Alternatively, the cable 58 may convert the wavelength set of the reflected light rays into a different wavelength set. The optical signal becomes the image beam 42b, which the generator/captor 62b scans across the screen 34b, along with the erase beam 52b, to generate the image 59. If the optical signal has a different wavelength set than the image beam 42b, then the generator/captor 62b converts the optical signal into the desired wavelength set, and forms the image beam 42b from the converted optical signal. So that it directs the image beam 42b onto the proper region 44b on the screen 34b at the proper time, the generator/captor 62b is synchronized to the generator/captor 62a. Techniques for performing such synchronization are discussed in commonly owned U.S. patent app. Ser. No. 09/129,739, entitled "Linked Scanner Imaging System And Method", which is heretofore incorporated by reference.

The system 55b is similar to the system 55a and includes the image generator/captor 62b, which scans an erase beam 52b and the image beam 42b across the screen 34b to generate the image 59 in a manner similar to that described above in conjunction with FIG. 2. As discussed above, the image generator/captor 62a scans the object 60 to generate the image beam 42b, which propagates to the generator/captor 62b via the cable 58. The generator/captor 62b also captures the image 56 by scanning rays of light reflected from the object 61 into the cable 58 as an optical signal as discussed above. This optical signal becomes the image beam 42a, which the generator/captor 62a scans across the screen 34a, along with the erase beam 52a, to generate the image 56.

Still referring to FIG. 3, in operation of the optical-linked imaging system 54, the image generator/captor 62a simultaneously captures the image 59 and generates the image 56 on the screen 34a. More specifically, the generator/captor 62a simultaneously scans the image 59 of the object 60 into the cable 58, and scans the image beam 42a from the cable 58 and the erase beam 52a across the screen 34a. The illuminator 24a illuminates the screen 34a as described above in conjunction with FIG. 1 such that the screen 34a displays/projects the image 56. Similarly, the image generator/captor 62b simultaneously captures the image 56 of the object 61 and generates the image 59 on the screen 34b. More specifically, the generator/captor 62b simultaneously scans the image 56 of the object 61 into the cable 58, and scans the image beam 42b from the cable 58 and the erase beam 52b across the screen 34b. The illuminator 24b illuminates the screen 34b as described above in conjunction with FIG. 1 such that the screen 34b displays/projects the image 59. Because of the known properties and behaviors of electromagnetic waves, the optical signal representing the captured image 56 does not significantly interfere with the optical signal representing the captured image 59 as these optical signals propagate in opposite directions through the cable 58.

To increase the signal strength, one may amplify the optical signals as they propagate through the cable 58. For example, one may use one or more erbium-doped fiber amplifiers (not shown) to amplify one or both of the optical signals. Examples of erbium-doped fiber amplifiers are discussed in U.S. Pat. No. 5,027,079, entitled "Erbium-Doped Fiber Amplifier," and U.S. Pat. No. 6,094,298, entitled "Erbium-Doped Fiber Amplifier With Automatic Gain Control," which are incorporated by reference.

FIG. 4A is a detailed view of the image generator/captor 62a of FIG. 3 according to an embodiment of the invention, and also includes the image amplifier 22a and the object 60 of FIG. 3. Although only the generator/captor 62a is discussed in detail, it is understood that the generator/captor 62b is similar.

The image generator/captor 62a includes a sinusoidally resonating mirror 70, an optical assembly 72 (represented by a lens), an erase-beam generator 74, and conventional beam splitters 75 and 77. Resonating mirrors such as the mirror 70 are discussed, e.g., in commonly owned U.S. patent app. Ser. No. 09/129,739, entitled "Linked Scanner Imaging System And Method", and U.S. Pat. No. 6,140,979, entitled "Scanned Display With Pinch, Timing, And Distortion Correction", which are heretofore incorporated by reference, and commonly owned U.S. patent app. Ser. No. 09/128,927, entitled "Real Time Millimeter Wave Scanning Imager", Ser. No. 09/128,954, entitled "Personal Display With Vision Tracking", Ser. No. 09/129,619, entitled "Low Light Viewer With Image Simulation", and Ser. No. 09/144,400, entitled "Scanned Beam Display", which are incorporated by reference.

The mirror 70 resonates at a predetermined horizontal rate and oscillates at a predetermined vertical rate to scan the image and erase beams 42a and 52a across the screen 34a and to direct the light rays 76—only one light ray 76 shown—reflected from the object 60 into the cable 58 via the assembly 72 as a continuous capture beam. The assembly 72 and beam splitter 77 respectively direct the image and erase beams 42a and 52a from the entry-exit point 79 and the generator 74 onto an incidence point 78—preferably the center point—of the mirror 70. As the mirror moves horizontally and vertically, the angles of incidence between the beams 42a and 52a and the mirror 70 change such that the beams 42a and 52a move across the screen 34a in horizontal and vertical directions, and thus scan the image 56 onto the screen 34a. Furthermore, the assembly 72 receives the light rays 76 as a single beam via reflection from the incidence point 78. As the mirror 70 moves horizontally and vertically, the angle of incidence between the incoming rays 76 and the mirror 70 changes. Therefore, although the rays 76 originate from different points on the object 60 at different times, they always enter the assembly 72 at or approximately at the same entry-exit point 79. Consequently, the mirror 70 scans the image 59 (FIG. 3) of the object 60 into the entry-exit point 79.

The beam splitter 75 allows the single mirror 70 to scan the image beam 42a from the cable 58 onto the screen 34a and to simultaneously scan the ray 76 from the object 60 into the cable 58. In most embodiments of the system 55a of FIG. 3, the image amplifier 22a and the object 60 are at different angles with respect to the reflector 70. Consequently, the beam splitter 75 allows both the image beam 42a and the ray 76 to be coincident with a common point of the mirror 70—here the center point 78—and thus with the end of the cable 58. Alternatively, one can cause the beam 42a and the ray 76 to be coincident with the end of the cable 58 according to conventional techniques for providing a common focal point for multiple light beams. For example, such techniques are disclosed in U.S. Pat. Nos. 5,907,425 and 6,007,208, which are both entitled "Miniature Scanning Confocal Microscope" and which are incorporated by reference.

The beam splitter 77 allows positioning of the beam 52a relatively close to the beam 42a on the screen 34a despite the erase-beam generator 74 being relatively far away from the end of the cable 58. Alternatively, one can omit the splitter 77 by placing the generator 74 relatively close to the end of the cable 58 such that the beams 42a and 52a are relatively close together. But because the beam diameters are relatively small and the cable 58 and generator 74 are relatively large, such relatively close placement, and thus elimination of the splitter 77, is often impractical or impossible.

In operation, the image generator/captor 62a simultaneously generates the image 56 on the screen 34a and captures the image 59 (FIG. 3) of the object 60. The image beam 42a, which the assembly 55b generates as discussed above in conjunction with FIG. 3, enters the optical assembly 72 from the cable 58, and the erase-beam generator 74 generates the erase beam 52a. The assembly 72 and the beam splitter 77 respectively direct the beams 42a and 52a to the incidence point 78 of the mirror 70, which scans the beams 42a and 52a across the screen 34a. In addition, the rays 76 strike the incidence point 78 of the mirror 70, which directs the rays 76 into the entry point 79 of the assembly 72 along the same or approximately the same path as the beam 42a. The assembly 72 directs the rays 76 into the cable 58. As discussed above, the beam 42a and rays 76—the assembly 55b uses the continuous beam formed by the rays 76 as the image beam 42b—do not significantly interfere with one another as they propagate in opposite directions through the cable 58.

Still referring to FIG. 4A, although shown as having a single mirror 70, the image generator/captor 62a may include multiple mirrors. For example, the generator/captor 62a may include a pair of mirrors, one for the image and erase beams 42a and 52a and one for the light rays 76. In such an embodiment, the mirrors can be positioned such that the beam splitter 75 can be omitted from the generator/captor 62a. Furthermore, including only single mirrors 70a and 70b in the generator/captors 62a and 62b may prevent the mirrors 70a and 70b from being synchronized for both optical signals—one signal propagating from the generator/captor 62a to the generator/captor 62b and vice versa. As discussed above, if the propagation delay of the optical signals is too long—this typically occurs when the cable 58 exceeds a few hundred feet—then the scanning angles of the mirrors 70a and 70b can be offset with respect to each other to compensate for this delay, and to thus reduce or eliminate corruption of the respective scanned-out image. But delay compensating for one scanned-out image often worsens the delay corruption for the other image. For example, delay compensating for the scanned-out image 56 may increase the corruption of the scanned-out image 59 (FIG. 3). One technique for preventing such corruption is to adjust the round-trip delay (e.g., from the mirror 70a, through the cable 58 to the mirror 70b, back from the mirror 70b, and through the cable 58 to the mirror 70a) to equal an integer multiple of the time it takes to scan a horizontal line of the image 56 or 59. Another technique is to use multiple mirrors as discussed above. This allows one to compensate for propagation delay in one direction independently of the propagation delay in the other direction.

FIG. 4B is a detailed view of the image generator/captor 62a of FIG. 3 according to another embodiment of the invention, and, like FIG. 4A, also includes the image amplifier 22a and the object 60 of FIG. 3. The image generator/captor 62a of FIG. 4B is similar to the generator/captor 62a of FIG. 4A except that the beam splitter 77 is effectively replaced with a conventional optical-signal combiner 80 and a conventional optical-beam separator 81. Although only the generator/captor 62a is discussed in detail, it is understood that the generator/captor 62b is similar.

The signal combiner 80 and beam separator 81 allow positioning of the erase beam 52a with respect to the image beam 42a without the beam splitter 77. The combiner 80 combines the optical signal—which will become the image beam 42a—and the erase beam 52a from the erase-beam generator 74 such that the beams 42a and 52a exit the end 82 of the combiner 80 and enter the beam separator 81 as collinear beams. In this embodiment, the beams 42a and 52a have different wavelengths such that their respective angles of refraction with the separator 81 are different. These different angles of refraction separate the beams by a distance d, which depends on the wavelengths of the beams 42a and 52a, the thickness and refractive index of the separator 81, and the angle of the separator 81 with respect to the collinear beams 42a and 52a. In the illustrated embodiment the optical assembly 72 is designed to maintain this separation distance d, although in other embodiments the assembly 72 can be designed to increase or decrease d.

In operation, the image generator/captor 62a simultaneously generates the image 56 on the screen 34a and captures the image 59 (FIG. 3) of the object 60. The erase-beam generator 74 generates the erase beam, and the combiner 80 combines the erase beam 52a with the image beam 42a. The beams 42a and 52a exit the end 82 and enter the separator 81 collinearly. The separator 81 separates the beams 42a and 52a. The optical assembly 72 respectively directs the beams 42a and 52a to the incidence points 78a and 78b of the mirror 70, which scans the beams 42a and 52a across the screen 34a via the beam splitter 75. In addition, the rays 76 strike the incidence point 78a of the mirror 70, which directs the rays 76 into the entry point 79a of the assembly 72 along the same or approximately the same path as the beam 42a. The assembly 72 directs the rays 76 into the cable 58 via the separator 81 and combiner 80.

Still referring to FIG. 4B, as discussed above in conjunction with FIG. 4A the generator/captor 62a may include a pair of mirrors, one for the image and erase beams 42a and 52a and one for the light rays 76.

FIGS. 5–12 are embodiments of erase-beam/image-beam/capture-beam scanning assemblies that image generators or image generators/captors such as the generator 52 (FIG. 2) or the generators/captors 62a and 62b (FIGS. 3–4) can incorporate. For clarity of explanation, the light rays 76—which form at least one capture beam—of FIG. 4 are omitted from FIGS. 5–12, and a portion of an image amplifier 22 is included in FIGS. 5–12. These scanning assemblies may receive the image beams 42 from a fiber-optic cable such as the cable 58 (FIGS. 3–4), or may generate the image beams 42 from electronic image data or according to other techniques. Furthermore, the scanning assemblies that generate and scan multiple image beams 42 may use time-division-multiplexing or other electronic techniques to generate these multiple image beams from a master image beam. Or, these scanning assemblies may receive the multiple image beams from another source or generate them from electronic image data.

Figure 5:
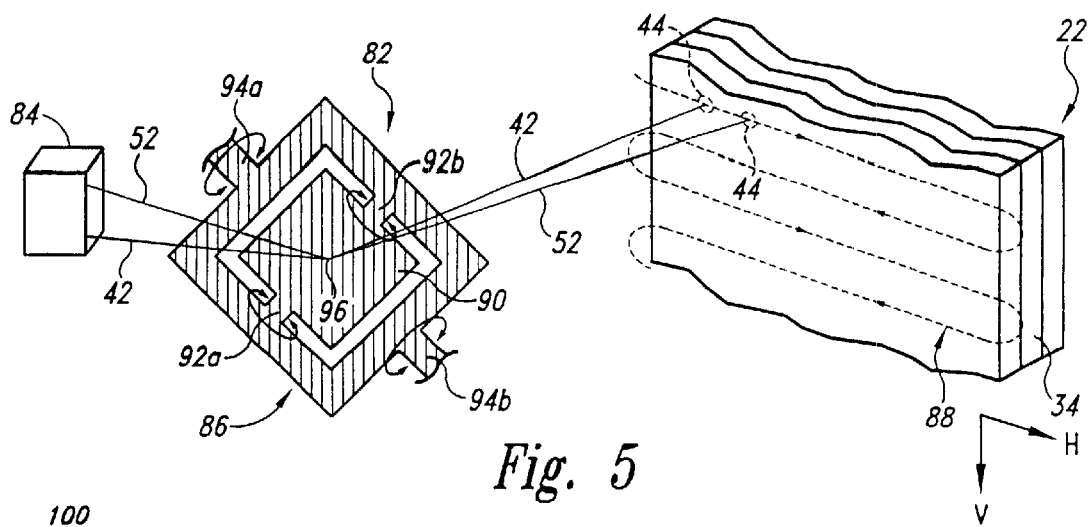
FIG. 5 illustrates a unidirectional single-erase-beam/single-image-beam scanning technique that the systems of FIGS. 2 and 3 can use according to an embodiment of the invention.

FIG. 5 is a unidirectional, single-mirror, single-erase-beam/single-image-beam scanning assembly 82 according to an embodiment of the invention. The assembly 82 includes an image generator 84 for generating the image and erase beams 42 and 52, and includes a mirror assembly 86 for scanning the beams 42 and 52 across the screen 34 in a sinusoidal scan pattern 88. During the scan from left to right in the horizontal (H) direction, the generator activates both the image and erase beams 42 and 52 such that the erase beam 52 leads the image beam 42 as described above in conjunction with FIG. 2. So that the erase beam 52 does not lag the image beam 42, the generator 84 deactivates the beams 42 and 52 during the scan from right to left, which is often called the fly-back scan. Sinusoidal scanning techniques that are similar to the described technique are disclosed in U.S. Pat. No. 6,140,979, entitled "Scanned Display With Pinch, Timing, And Distortion Correction", and commonly owned U.S. patent application Ser. No. 09/128,927, entitled "Real Time Millimeter Wave Scanning Imager", Ser. No. 09/129,739, entitled "Linked Scanner Imaging System And Method", Ser. No. 09/128,954, entitled "Personal Display With Vision Tracking", Ser. No. 09/129,619, entitled "Low Light Viewer With Image Simulation", and Ser. No. 09/144,400, entitled "Scanned Beam Display", which are heretofore incorporated by reference.

Still referring to FIG. 5, in one embodiment the mirror assembly 86 is a micro-electromechanical (MEM) mirror assembly having a mirror 90, which pivots back and forth in the horizontal direction on torsion arms 92a and 92b and in the vertical (V) direction on torsion arms 94a and 94b to scan the beams 42 and 52. Typically, the beams 42 and 52 are incident on a center point 96 of the mirror 90, although the beams may be incident on another point of the mirror 90. An electronic signal applied to electrodes (not shown) respectively maintains the horizontal pivot of the mirror 90 at a horizontal resonant scanning frequency that is a function of the mirror dimensions, torsion arm dimensions (92a and 92b), and other parameters of the mirror assembly 86. Alternatively, the horizontal scanner frequency may not be the resonant horizontal scanning frequency. A steady-state magnetic filed generated by magnets (not shown) and an alternating magnetic field generated by a current-carrying coil (not shown) on a gimbal maintain the vertical pivot of the mirror 90 at a vertical scanning frequency. Because the vertical scanning frequency is relatively low, it may not be the resonant vertical frequency of the mirror assembly 86. Alternatively, the mirror 90 may be electro-magnetically driven in the horizontal direction, or electrostatically in the vertical direction. Other techniques such as piezoelectric or bimorphic techniques may also be used to drive the mirror 90 horizontally or vertically. MEM mirror assemblies such as the assembly 86 are discussed in U.S. Pat. No. 5,629,790, entitled "Micromachined Torsional Scanner" to Neukermans et al. and U.S. Pat. No. 6,140,979, entitled "Scanned Display With Pinch, Timing, And Distortion Correction", and in commonly owned U.S. patent app. Ser. No. 09/128, 927, entitled "Real Time Millimeter Wave Scanning Imager", Ser. No. 09/128,954, entitled "Personal Display With Vision Tracking", Ser. No. 09/129,619, entitled "Low Light Viewer With Image Simulation", and Ser. No. 09/144, 400, entitled "Scanned Beam Display", which are heretofore incorporated by reference. In another embodiment, the mirror assembly 86 is a mechanical assembly such as disclosed in commonly owned U.S. patent app. Ser. No. 09/129,739, entitled "Linked Scanner Imaging System And Method", which is heretofore incorporated by reference.

In operation, the mirror 90 of the mirror assembly scans the active beams 42 and 52 across the screen 34 from left to right, and scans the inactive beams 42 and 52 across the screen 34 from right to left. During a left-to-right scan, the image generator 84 activates the beams 42 and 52 and directs them to the incidence point 96. The mirror 90 pivots from left to right to scan the active beams 42 and 52 across the screen 34 and to thus generate an image (not shown). In the illustrated embodiment, the mirror 90 scans the beams 42 and 52 past the right edge of the screen 34. This over scanning helps to avoid raster pinch, which is an undesirable result of sinusoidal scanning as discussed in U.S. Pat. No. 6,140,979, entitled "Scanned Display With Pinch, Timing, And Distortion Correction", which is heretofore incorporated by reference. For unidirectional writing (i.e., where the beam 42 is inactive during the fly-back scan), raster pinch is typically not a problem. Therefore, other embodiments the mirror 90 may not over scan the beams 42 and 52. When the mirror 90 pivots to its rightmost position—or to another predetermined rightward position such as the beam 42 reaching the right edge of the screen 34—the generator 84 deactivates the beams 42 and 52 for the fly-back scan. In one embodiment, the arms 92a and 92b produce voltages that are proportional to the horizontal pivot position of the mirror 90. Torsion arms that produce such voltages are discussed in U.S. Pat. No. 5,648,618, entitled "Micromachined Hinge Having An Integral Torsion Sensor" to Neukermans et al., which is incorporated by reference. By monitoring these voltages, circuitry (not shown) can cause the generator 84 to deactivate the beams 42 and 52 at the desired time. The mirror 90 then scans the inactive beams 42 and 52 from right to left across the screen 34. When the mirror 90 reaches a desired leftward rotational position, the generator 84 activates the beams 42 and 52 for the next left-to-right scan.

During this horizontal scanning, the mirror 90 is also pivoting on the arms 94a and 94b via the gimbal ring to vertically scan the screen 34 from top to bottom. Once the mirror 90 reaches its bottommost position, it begins pivoting toward its top position. During this upward pivot, the mirror 90 may continue to scan the beams 42 and 52 in the horizontal direction as described above. Or, the image generator 84 may deactivate the beams 42 and 52 until the mirror 90 reaches its topmost position, and then activate the beams as described above to scan the image during the mirror's top-to-bottom pivot. Alternatively, the mirror 90 may scan the image during the mirror's bottom-to-top pivot only.

Alternate embodiments of the scanning assembly 82 are also contemplated. For example, the beams 42 and 52 may be generated by separate image generators instead of a single image generator 84. In addition, the generator 84 may activate the beam 52 during the fly-back scan to erase the screen 34 between the lines scanned with the image beam 42. Furthermore, the assembly 82 may include two reflectors 86, one to scan the image beam 42 and the other to scan the erase beam 52. Moreover, the assembly 82 may scan the beams 42 and 52 in a pattern other than the sinusoidal pattern 88.

Figure 6:
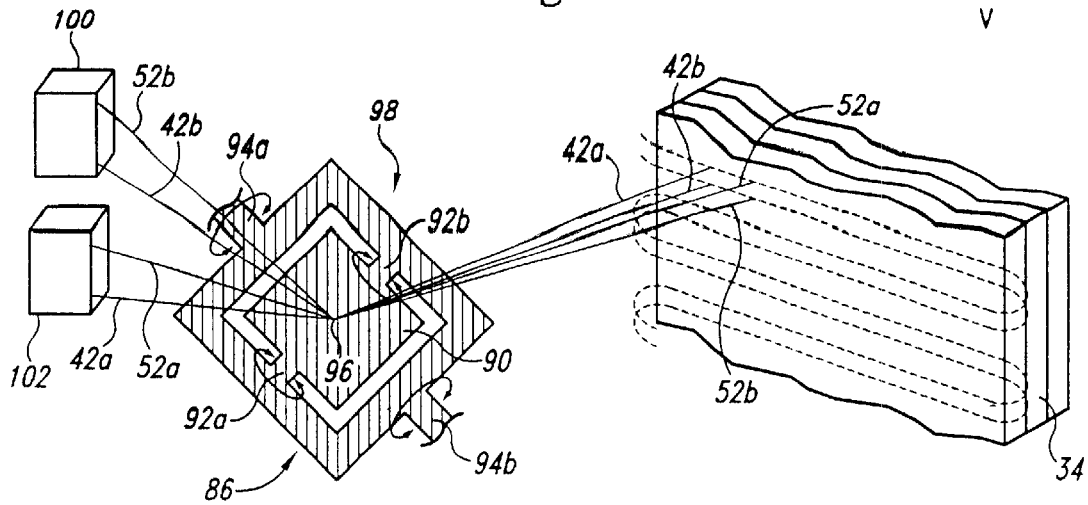
FIG. 6 illustrates a unidirectional multiple-erase-beam/multiple-image-beam scanning technique that the systems of FIGS. 2 and 3 can use according to an embodiment of the invention.

FIG. 6 is a unidirectional, single-mirror, multi-erase-beam/multi-image-beam scanning assembly 98 according to an embodiment of the invention. One difference between the scanning assemblies 82 (FIG. 5) and 98 is that the assembly 98 scans more than one pair—two pairs in the illustrated embodiment—of image and erase beams 42 and 52. Thus, the assembly 98 can increase the resolution of the scanned image (not shown) for a given horizontal scan rate (the horizontal pivoting speed of the mirror 90).

The scanning assembly 98 includes a first image generator 100 for generating the image and erase beams 42a and 52a, and includes a second image generator 102 for generating the image and erase beams 42b and 52b. In one embodiment, the generators 100 and 102 are similar to the image generator 84 (FIG. 5). The remaining elements of the assembly 98 are the same as or similar to the elements of the scanning assembly 82 (FIG. 5). During the scan from left to right in the horizontal direction, the generators 100 and 102 respectively activate the image and erase beams 42a, 52a, 42b, and 52b such that the erase beams 52a and 52b respectively lead the image beams 42a and 42b as described above in conjunction with FIG. 2. So that the erase beams 52a and 52b do not lag the image beams 42a and 42b, the generators 100 and 102 deactivate the beams 42a, 52a, 42b, and 52b during the fly-back scan from right to left.

Still referring to FIG. 6, the scanning assembly 98 operates in a manner that is similar to the manner in which the scanning assembly 82 (FIG. 5) operates. Specifically, the mirror 90 scans the active beams 42a, 52a, 42b, and 52b across the screen 34 from left to right, and scans the inactive beams 42a, 52a, 42b, and 52b across the screen 34 from right to left. During a left-to-right scan, the beam generators 100 and 102 activate the beams 42a, 52a, 42b, and 52b and direct them to the incidence point 96. The mirror 90 pivots from left to right to scan the active beams 42a, 52a, 42b, and 52b across the screen 34 and to thus generate an image (not shown). When the mirror 90 pivots to its rightmost position—or to another predetermined rightward position such as the beams 42a and 42b reaching the right edge of the screen 34—the beam generators 100 and 102 deactivate the beams 42a, 52a, 42b, and 52 for the fly-back scan. The mirror 90 then scans the inactive beams 42a, 52a, 42b, and 52b from right to left across the screen 34. When the mirror 90 reaches a desired leftward rotational position, the generators 100 and 102 activate the beams 42a, 52a, 42b, and 52b for the next left-to-right scan.

During this horizontal scanning procedure, the mirror 90 is also pivoting on the arms 94a and 94b via the gimbal ring 97 to vertically scan the screen 34 from top to bottom. Once the mirror 90 reaches its bottommost position, it begins pivoting toward its top position. During this upward pivot, the mirror 90 may continue to scan the beams 42a, 52a, 42b, and 52b in the horizontal direction as described above. Or, the generators 100 and 102 may respectively deactivate the beams 42a, 52a, 42b, and 52b until the mirror 90 reaches its topmost position, and then activate the beams as described above to scan the image during the mirror's top-to-bottom pivot. Alternatively, the mirror 90 may scan the image during the mirror's bottom-to-top pivot only.

Alternate embodiments of the scanning assembly 98 are contemplated. For example, the beams 42a, 52a, 42b, and 52b may be generated by separate image generators or by a single image generator. Or, the beams 42a and 42b may be generated by one generator, and the beams 52a and 52b by another generator. In addition, the assembly 98 may generate and scan more than two pairs of image and erase beams. Moreover, alternate embodiments similar to those discussed above in conjunction with FIG. 5 are contemplated where possible.

Figure 7:
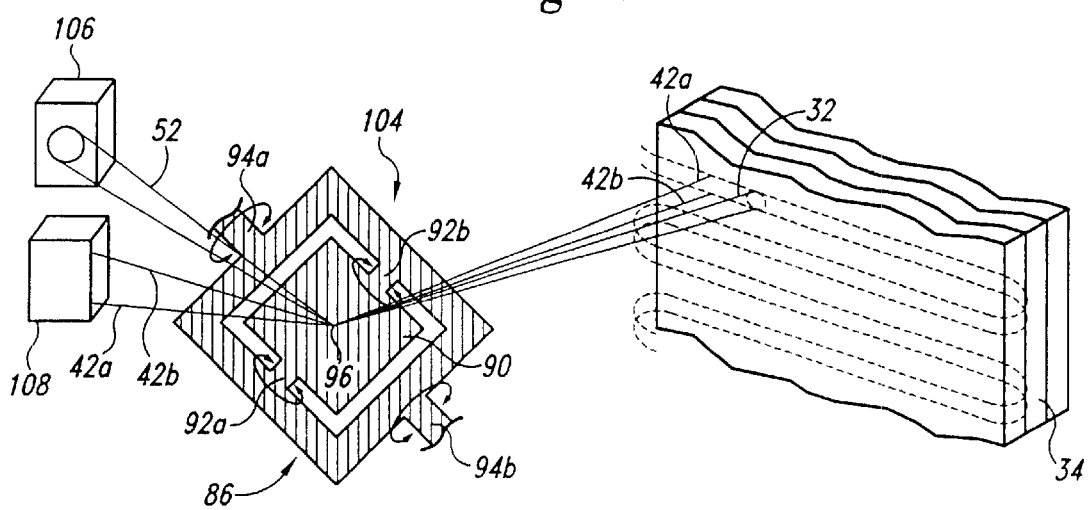
FIG. 7 illustrates a unidirectional wide-erase-beam/multiple-image-beam scanning technique that the systems of FIGS. 2 and 3 can use according to an embodiment of the invention.

FIG. 7 is a unidirectional, single-mirror wide-erase-beam/multi-image-beam scanning assembly 104 according to an embodiment of the invention. One difference between the scanning assemblies 98 (FIG. 6) and 104 is that the assembly 104 scans a single, wide erase beam 52 instead of multiple, narrow erase beams. Thus, the assembly 104 is often less complex and less expensive than the assembly 98.

The scanning assembly 104 includes a first beam generator 106 for generating a wide erase beam 52, and includes a second beam generator 108 for generating multiple image beams—here two—42a and 42b. Because conventional techniques, such as a laser with associated coupling optics, exist for generating a wide optical beam, a detailed discussion of the generation of the wide erase beam 52 is omitted for clarity. The remaining elements of the assembly 104 are the same as or similar to the elements of the scanning assembly 98 (FIG. 6). During the scan from left to right in the horizontal direction, the generators 106 and 108 respectively activate the wide erase beam 52 and the image beams 42a and 42b such that the erase beam 52 leads both the image beams 42a and 42b as described above in conjunction with FIG. 2. The erase beam 52 is wide enough to simultaneously erase the paths that the image beams 42a and 42b will scan. So that the erase beam 52 does not lag the image beams 42a and 42b, the generators 106 and 108 respectively deactivate the erase beam 52 and the image beams 42a and 42b during the fly-back scan from right to left.

Still referring to FIG. 7, the scanning assembly 104 operates in a manner that is similar to the manner in which the scanning assembly 98 (FIG. 6) operates. Specifically, the mirror 90 scans the active beams 42a, 42b, and 52 across the screen 34 from left to right, and scans the inactive beams 42a, 42b, and 52 across the screen 34 from right to left. During a left-to-right scan, the beam generators 106 and 108 respectively activate the erase beam 52 and the image beams 42a and 42b and direct them to the incidence point 96. The mirror 90 pivots from left to right to scan the active beams 42a, 42b, and 52 across the screen 34 and to thus generate an image (not shown). When the mirror 90 pivots to its rightmost position—or to another predetermined rightward position such as the beams 42a and 42b reaching the right edge of the screen 34—the beam generators 106 and 108 respectively deactivate the erase beam 52 and the image beams 42a and 42b for the fly-back scan. The mirror 90 then scans the inactive beams 42a, 42b, and 52 from right to left across the screen 34. When the mirror 90 reaches a desired leftward rotational position, the generators 106 and 108 respectively activate the beams 42a, 42b, and 52 for the next left-to-right scan.

During this horizontal scanning procedure, the mirror 90 is also pivoting on the arms 94a and 94b to vertically scan the screen 34 from top to bottom. Once the mirror 90 reaches its bottommost position, it begins pivoting toward its top position. During this upward pivot, the mirror 90 may continue to scan the beams 42a, 42b, and 52 in the horizontal direction as described above. Or, the generators 106 and 108 may respectively deactivate the erase beam 52 and the image beams 42a and 42b until the mirror 90 reaches its topmost position, and then activate the beams as described above to scan the image during the mirror's top-to-bottom pivot. Alternatively, the assembly 104 may perform the scanning of the image during the mirror's bottom-to-top pivot only.

Figure 8:
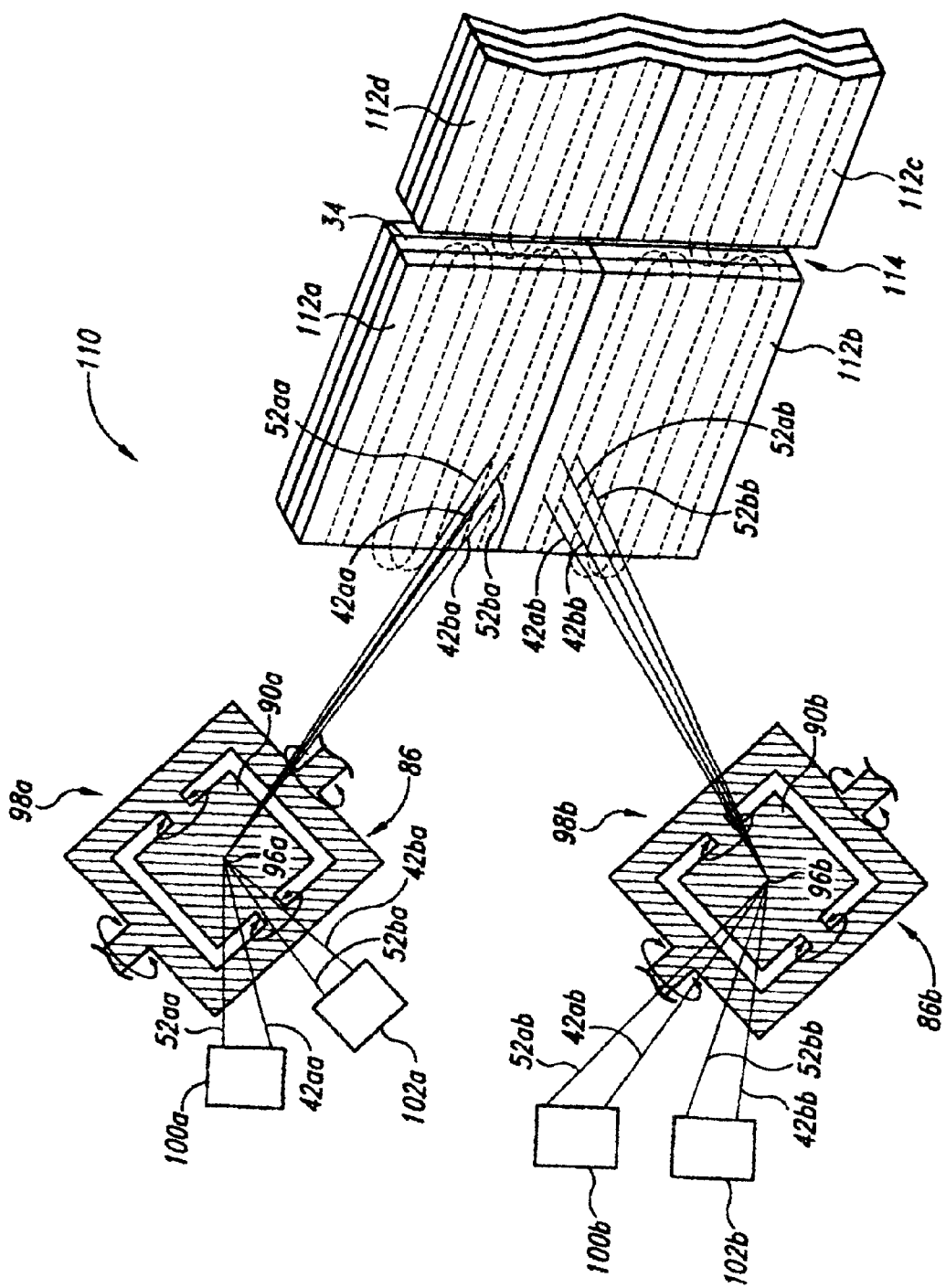
FIG. 8 illustrates a unidirectional, multiple-erase-beam/multiple-image-beam tiling technique that the systems of FIGS. 2 and 3 can use according to an embodiment of the invention.

Alternate embodiments of the scanning assembly 104 are contemplated. For example, the beams 42a, and 42b may be generated by separate image generators. Or, a single generator may generate the beams 42a, 42b, and 52. In addition, alternate embodiments similar to those discussed above in conjunction with FIGS. 5–6 are contemplated where possible. FIG. 8 is a unidirectional, tiling, multi-mirror, multi-erase-beam/multi-image-beam scanning assembly 110 according to an embodiment of the invention. The assembly 110 includes multiple scanning assemblies 98a–98d—only 98a and 98b are shown for clarity—which are each similar to the scanning assembly 98 (FIG. 6) and which each scan a portion of an image (not shown) onto a respective section, i.e., tile, 112a–112d of the screen 34. Scanning portions of an image onto respective screen tiles is often called "tiling". Tiling typically involves simultaneously scanning a plurality of screen tiles, although in some applications, single tile may be scanned, or multiple tiles may be scanned one at a time. By scanning a plurality of tiles simultaneously, the assembly 110 can increase the resolution of the scanned image for a given horizontal scan rates of the mirrors 90a–90d. Furthermore, to allow horizontal over scanning for reducing raster pinch, a gap 114 may be included between horizontally adjacent tiles 112 of the screen 34. The gap 114 is typically wide enough to allow over scanning of one tile 112 without scanning a horizontally adjacent tile 112. For example, the gap 114 is typically wide enough to allow the image beams 42aa and 42ba to over scan the tile 112a without striking the tile 112d. Alternatively, instead of including a gap 114, the screen may include a "dead" strip having the same width as the gap 114. The dead strip is a portion of the screen on which no portion of the image is scanned.

Still referring to FIG. 8, with respect to the screen tiles 112a–112d, each of the scanning assemblies 98a–98d operates in a manner that is similar to the manner in which the scanning assembly 98 (FIG. 6) operates as discussed above. One potential difference in operation, however, is that depending on the width of the gap 114 and how far to the right the mirrors 90a and 90b respectively scan the image beams 42aa, 42ba, 42ab, and 42bb, the generators 100a, 102a, 100b, and 102b may deactivate the erase beams 52aa, 52ba, 52ab, and 52bb before deactivating the beams 42aa, 42ab, 42ba, and 42bb to prevent the beams 52aa, 52ba, 52ab, and 52bb from respectively striking the tiles 112d and 112c.

Figure 9:
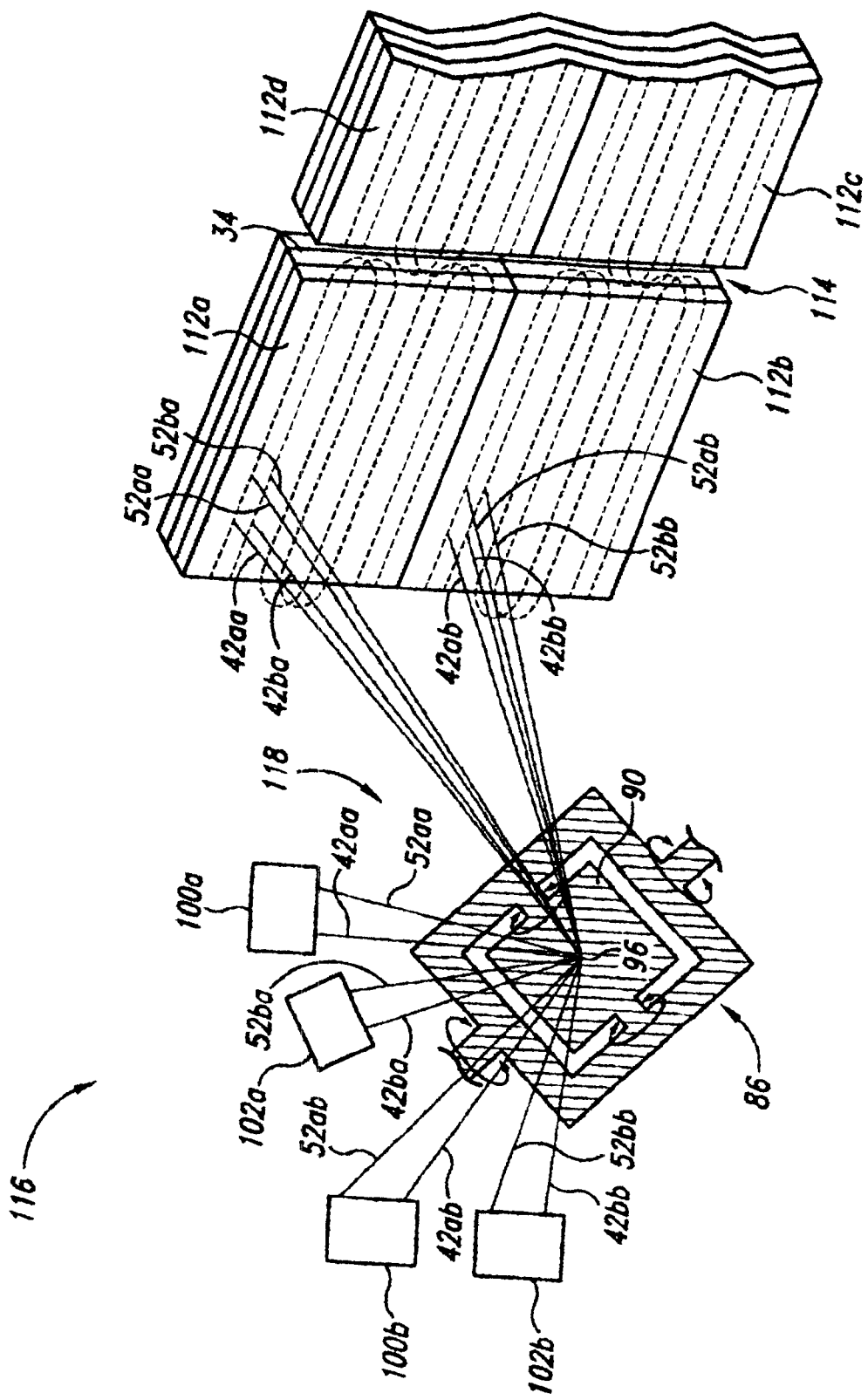
FIG. 9 illustrates a unidirectional, multiple-erase-beam/multiple-image-beam tiling technique that the systems of FIGS. 2 and 3 can use according to another embodiment of the invention.

Alternate embodiments of the scanning assembly 110 are contemplated. For example, the screen 34 may be divided into more or fewer than four tiles 112. In addition, each scanning assembly 98 may simultaneously scan multiple tiles. Furthermore, the assembly 110 may include one or more of the scanning assemblies 82 (FIG. 5) or the scanning assemblies 104 (FIG. 7)—and implement the scanning techniques associated with these assemblies—in addition to or in place of the scanning assemblies 98. Moreover, alternate embodiments similar to those discussed above in conjunction with FIGS. 5–7 are contemplated where possible. In addition, because the gap 114 may cause artifacts in the scanned image, one may eliminate the gap 114 and turn the image and erase beams 42 and 52 off when they reach an edge of a tile 112. Consequently, even if the beams 42 and 52 over scan the tile 112, they will not corrupt the image being scanned onto an adjacent tile 112. Alternatively, because they typically scan the same portion of an image onto the same region of a tile 112, the beams 42 may over scan the edges of adjacent tiles 112 without causing artifacts in the scanned image. But because the pixels in these over-scan regions may be scanned multiple times per vertical scan, one may adjust the intensity of the beams 42 in these over-scan regions such that the image is not noticeably brighter in the over-scan regions as compared to the non-over-scan regions. Furthermore, to avoid turning off the erase beams 52 in the over-scan regions, one can design the assembly 110 such that the erase beams 52 lead the respective image beams 42 by one or more horizontal lines as discussed below in conjunction with FIG. 12. FIG. 9 is a unidirectional, tiling, single-mirror, multi-erase-beam/multi-image-beam scanning assembly 116 according to an embodiment of the invention. The assembly 116 is similar to the assembly 110 (FIG. 8) except that it includes a scanning assembly 118, which is a modified version of the scanning assembly 98 (FIG. 6). Specifically, the assembly 118 includes a single mirror assembly 86 for scanning all of the beams 42 and 52 across all of the tiles 112a–112d. (For clarity, the beams 42 and 52 that scan the tiles 112c–112d are omitted.) Therefore, because it includes fewer mirror assemblies 86, the assembly 116 is often less complex and less expensive than the assembly 110. The particular geometry for the mirror assembly 86 of the scanning assembly 86 and other components will vary depending upon the application. However, some geometries for tiling with a single scanner are described in commonly owned U.S. patent application Ser. No. 09/369,673, entitled "Scanned Display With Variation Compensation", which is incorporated by reference.

Alternate embodiments of the scanning assembly 116 are contemplated. For example, the assembly 116 may include a single image generator to generate all of the beams 42 and 52, or may include image generators that each generate more than one but fewer than all pairs of the beams 42 and 52. In addition, the assembly 116 may include modified (to generate the desired number of beams 42 and 52) versions of the scanning assemblies 82 (FIG. 5) or the scanning assemblies 104 (FIG. 7)—and implement the scanning techniques associated with these assemblies—in addition to or in place of the scanning assembly 118. Moreover, alternate embodiments similar to those discussed above in conjunction with FIGS. 5–8 are contemplated where possible.

Figure 10:
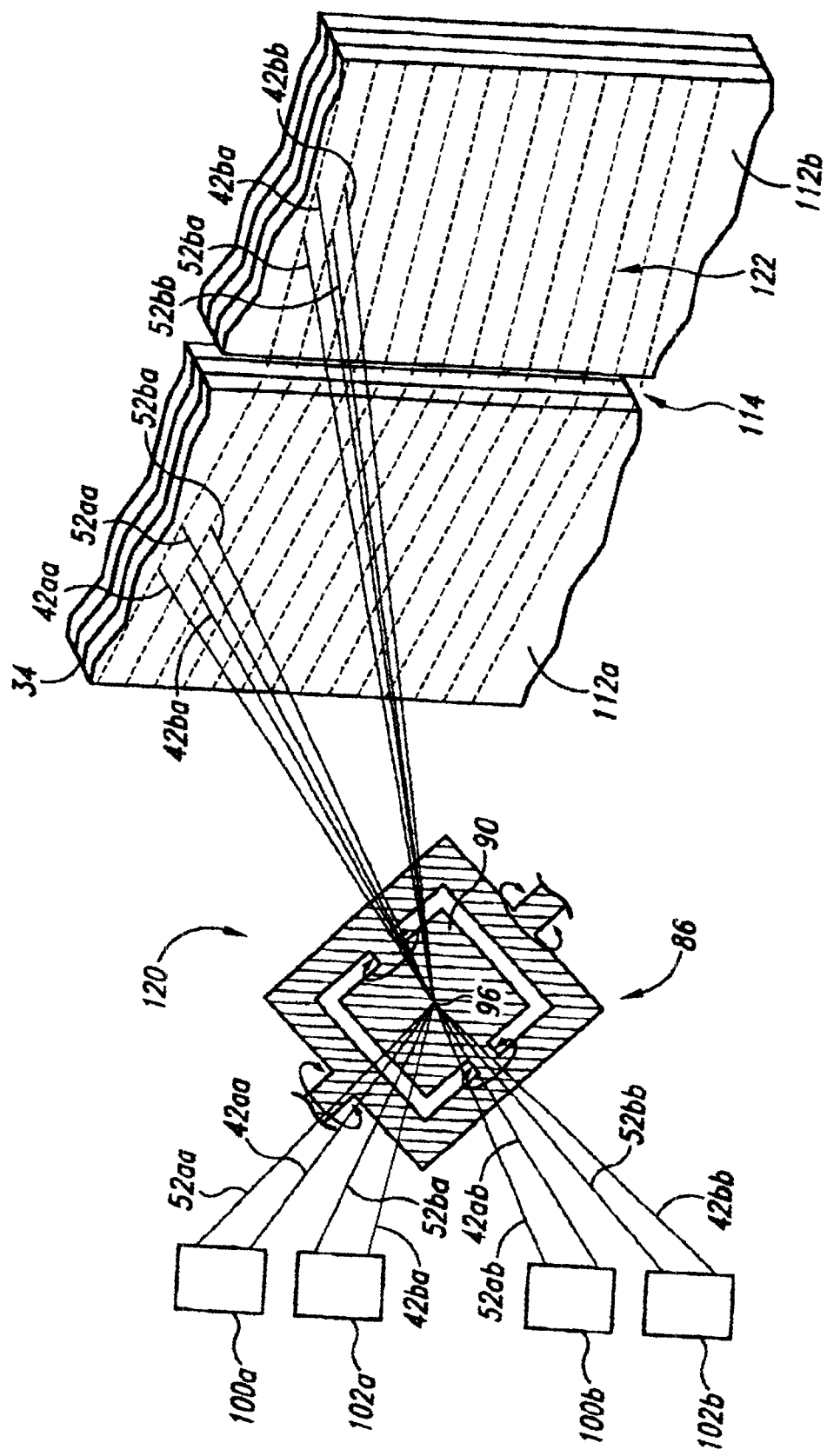
FIG. 10 illustrates a switched-feed, multiple-erase-beam/multiple-image-beam tiling technique that the systems of FIGS. 2 and 3 can use according to an embodiment of the invention.

FIG. 10 is a bidirectional, tiling, single-mirror, multi-erase-beam/multi-image-beam scanning assembly 120 according to an embodiment of the invention. Unlike the scanning assemblies of FIGS. 5–9, the assembly 120 implements a bidirectional sinusoidal scanning pattern 122 to scan an image onto the screen 34 in both the left-to-right and the right-to-left horizontal directions. For clarity, the sinusoidal pattern 122 is shown having straight scan paths and the fly-back scan paths are omitted. A similar bidirectional scanning technique is discussed in commonly owned U.S. patent app. Ser. No. 09/370,790, entitled "Scanned Imaging Apparatus With Switched Feeds", which is incorporated by reference.

The assembly 120 includes the single mirror assembly 86 for bidirectionally scanning multiple pairs of image and erase beams 42 and 52 across multiple tiles 112 of the screen 34, and includes beam generators 100a, 102a, 100b, and 102b for respectively generating these beam pairs. More specifically, the mirror 90 scans active beams 42aa, 52aa, 42ab, and 52ab across the tile 112a while the mirror 90 pivots horizontally from left to right, and scans active beams 42ba, 52ba, 42bb, and 52bb across the tile 112b while the mirror 90 pivots horizontally from right to left. The erase beams 52aa, 52ab, 52ba, and 52bb are positioned such that they respectively lead the image beams 42aa, 42ab, 42ba, and 42bb across the tiles 112a and 112b. The optional gap or dead strip 114 allows over scanning without undesirable scanning of the adjacent tile 112. For example, the gap 114 allows the mirror 90 to scan the beams 42aa, 52aa, 42ab, and 52ab past the right edge of the tile 112a without striking the tile 112b with these beams. Alternatively, one can reduce the width of or eliminate the gap 14 by precisely calibrating the mirror 90 such that there is no over scanning of the tiles 112a and 112b.

In operation, the mirror 90 scans the active beams 42aa, 42ab, 52aa, and 52ab across the tile 112a from left to right, and scans the active beams 42ba, 42bb, 52ba, and 52bb across the tile 112b from right to left. During a left-to-right scan, the beam generators 100a and 102a respectively activate the beams 42aa, 52aa, 42ab, and 52bb and direct them to the incidence point 96, and the beam generators 100b and 102b respectively deactivate the beams 42ba, 52ba, 42bb, and 52bb. When the mirror 90 pivots to its rightmost position—or to another predetermined rightward position such as the beams 42aa and 42ab reaching the right edge of the tile 112a—the generators 100a and 102a respectively deactivate the beams 42aa, 52aa, 42ab, and 52ab, and the generators 100b and 102b respectively activate the beams 42ba, 52ba, 42bb, and 52bb for the right-to-left scan. Depending on the width of the gap 114 and how far to the right the mirror 90 scans the image beams 42aa and 42ba, the generators 100a and 102a may deactivate the erase beams 52aa and 52ba before deactivating the beams 42aa and 42ba to prevent the beams 52aa and 52ba from striking the tile 112b. The mirror 90 then scans the active beams 42ba, 52ba, 42bb, and 52bb from right to left across the tile 112b. When the mirror 90 reaches a desired leftward rotational position, the generators 100a and 102a respectively activate the beams 42aa, 52aa, 42ab, and 52ab and the generators 100b and 102b respectively deactivate the beams 42ba, 52ba, 42bb, and 52bb for the next left-to-right scan of the tile 112a. Depending on the width of the gap 114 and how far to the left the mirror 90 scans the image beams 42ba and 42bb, the generators 100b and 102b may deactivate the erase beams 52ba and 52bb before deactivating the beams 42ba and 42bb to prevent the beams 52ba and 52bb from striking the tile 112a.

During this bidirectional horizontal scanning procedure, the mirror 90 is also pivoting vertically to scan the tiles 112a and 112b from top to bottom. Once the mirror 90 reaches its bottommost position, it begins pivoting toward its top position. During this upward pivot, the mirror 90 may continue to scan the beams 42aa, 52aa, 42ab, 52ab, 42ba, 52ba, 42bb, and 52bb in the horizontal direction as described above. Or, the generators 100a, 102a, 100b, and 102b deactivate the beams until the mirror 90 reaches its topmost position, and then activate the beams as described above to scan the image during the mirror's top-to-bottom pivot. Alternatively, the mirror 90 may scan the image during its bottom-to-top pivot only.

Alternative embodiments of the scanning assembly 120 are contemplated. For example, one can modify the assembly 120 to scan more or fewer than two pairs of image and erase beams, to implement the wide-erase-beam technique of FIG. 7, or to implement the multiple-mirror or no-gap techniques of FIG. 8.

Figure 11:
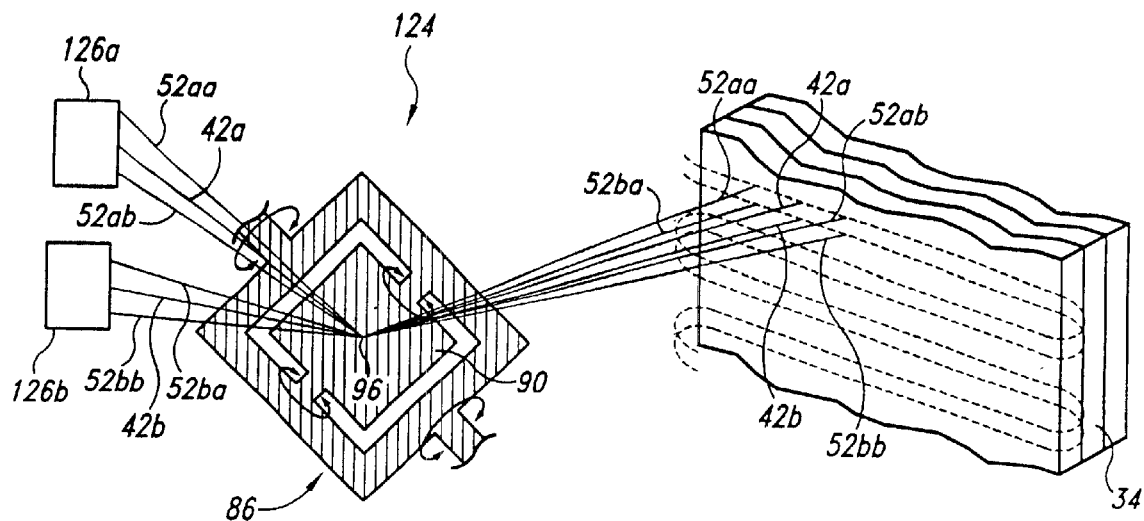
FIG. 11 illustrates a bidirectional, multiple-erase-beam/multiple-image-beam scanning technique that the systems of FIGS. 2 and 3 can use according to an embodiment of the invention.

FIG. 11 is a bidirectional, single-mirror, multi-erase-beam/multi-image-beam scanning assembly 124 according to an embodiment of the invention. The assembly 124 is similar to the scanning assembly 120 of FIG. 10 except that it scans an image onto the same section of the screen 34 during both the left-to-right and right-to-left horizontal scans. Therefore, for the same horizontal scan rate, the assembly 124 often generates a higher-resolution image than the assembly 120 or the scanning assemblies of FIGS. 5–9. To ensure that an erase beam 52 leads an image beam 42 in both horizontal scanning directions, beam generators 126a and 126b each generate two erase beams 52 per image beam 42, one erase beam for the left-to-right scan and one erase beam for the right-to-left scan.

The assembly 124 includes a single mirror assembly 86 for bidirectionally scanning multiple trios of image and erase beams 42a, 52aa, and 52ab and 42b, 52ba, and 52bb across the screen 34, and includes the beam generators 126a and 126b for respectively generating these beam trios. More specifically, the mirror 90 scans the active beams 42a and 52ab and 42b and 52bb across the screen 34 while the mirror 90 pivots horizontally from left to right—the generators 126a and 126b deactivate the erase beams 52aa and 52ba during the left-to-right scan—and scans active beams 42b, 52aa, and 52ba across the screen 34 while the mirror 90 pivots horizontally from right to left—the generators 126a and 126b deactivate the erase beams 52ab and 52bb during the right-to-left scan. Because the mirror 90 scans the image onto the screen 34 in both horizontal directions, raster pinch, which is an undesirable occurrence discussed in heretofore incorporated U.S. Pat. No. 6,140,979, entitled "Scanned Display With Pinch, Timing, And Distortion Correction", may be a problem. Therefore, to reduce or avoid the problems associated with raster pinch, in the illustrated embodiment the mirror 90 over scans the image beams 42a and 42b past both the left and right edges of the screen 34. U.S. Pat. No. 6,140,979, entitled "Scanned Display With Pinch, Timing, And Distortion Correction", also discusses other techniques for reducing or eliminating the affects of raster pinch, and one can modify the assembly 124 to implement one or more of these techniques.

Still referring to FIG. 11, in operation the mirror 90 scans the active beams 42a, 42b, 52ab, and 52bb across the screen 34 from left to right, and scans the active beams 42a, 42b, 52aa, and 52ba across the screen 34 from right to left. During a left-to-right scan, the beam generators 126a and 126b respectively activate the beams 42a, 52ab, 42b, and 52bb and direct them to the incidence point 96, and respectively deactivate the beams 52aa and 52ba. When the mirror 90 pivots to its rightmost position—or to another predetermined rightward position such as the inactive beams 52aa and 52ba reaching the right edge of the screen 34—the generators 126a and 126b respectively deactivate the beams 52ab and 52bb and respectively activate the beams 42a, 52aa, 42b, and 52ba for the right-to-left scan. The mirror 90 then scans the active beams 42a, 52aa, 42b, and 52ba from right to left across the screen 34. When the mirror 90 reaches a desired leftward rotational position, the generators 126a and 126b respectively activate the beams 42a, 52ab, 42b, and 52bb and respectively deactivate the beams 52aa and 52ba for the next left-to-right scan of the screen 34.

During this bidirectional horizontal scanning procedure, the mirror 90 is also pivoting vertically to scan the screen 34 from top to bottom. Once the mirror 90 reaches its bottommost position, it begins pivoting toward its top position. During this upward pivot, the mirror 90 may continue to scan the beams 42a, 42b, 52aa, 52ab, 52ba, and 52bb in the horizontal directions as described above. Or, the generators 126a and 126b may deactivate the beams until the mirror 90 reaches its topmost position, and then activate the beams as described above to scan the image during the mirror's top-to-bottom pivot. Alternatively, the mirror 90 may scan the image during its bottom-to-top pivot only.

Alternative embodiments of the scanning assembly 124 are contemplated. For example, one can modify the assembly 124 to scan more or fewer than two trios of image and erase beams, to implement the multiple-mirror technique of FIG. 8., to implement the tiling techniques of FIGS. 8 and 9, or to implement the switched scanning technique of FIG. 10. In addition, one can modify the assembly 124 according to the technique of FIG. 7 by replacing the beams 52aa and 52ba with a first wide erase beam and by replacing the beams 52ba and 52bb with a second wide erase beam.

One potential problem with the bidirectional, multi-beam scanning technique of FIG. 11 is that the beams 52aa and 52ab may crossover, and thus erase, portions of lines scanned by the image beam 42b. These crossover points are typically near the edges of the screen 34. For example, near the beginning of a left-to-right scan, the beam 52ab may crossover a points of the previous line scanned by the beam 42b near the left edge of the screen 34. Similarly, near the beginning of a right-to-left scan, the beam 52aa may crossover a point of the previous line scanned by the beam 42b near the right edge of the screen 34. These erased crossover points may form artifacts that degrade the scanned image.

One solution to this crossover problem is to increase the distances that the beams 42 and 52 over scan the right and left edges of the screen 34 such that the crossover points occur beyond the edges of the screen 34. Another solution is to eliminate the beams 52aa and 52bb and make the beams 52ba and 52bb wide enough to erase the scan path that the beam 42a traverses. Yet another solution is to use an erase beam 52 that leads the beam 42b by one or more horizontal scan lines as discussed below in conjunction with FIG. 12.

Figure 12:
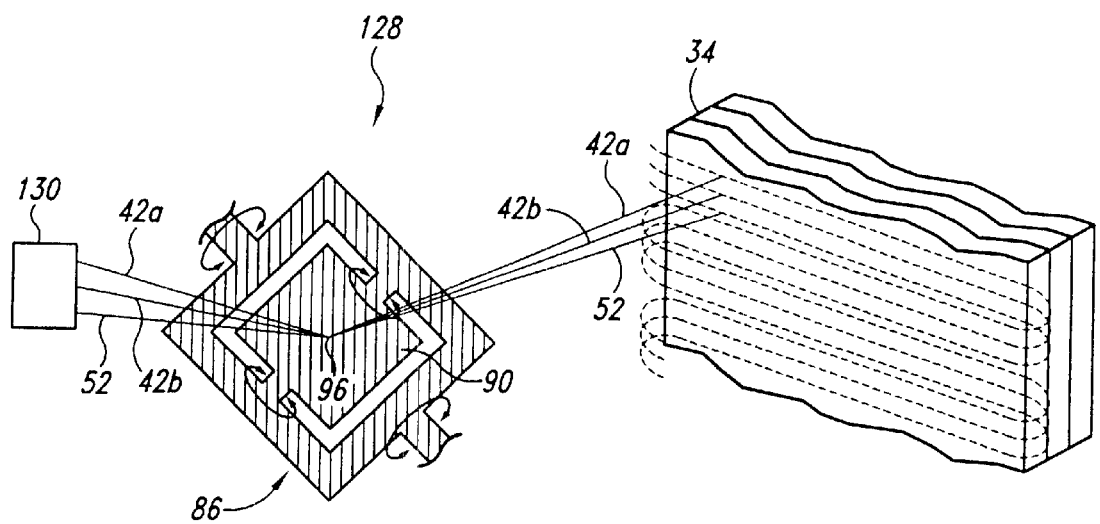
FIG. 12 illustrates a bidirectional, single-erase-beam/multiple-image-beam scanning technique that the systems of FIGS. 2 and 3 can use according to an embodiment of the invention.

FIG. 12 is a bidirectional, single-mirror, single-erase-beam/multi-image-beam scanning assembly 128 according to an embodiment of the invention. Unlike the scanning assemblies of FIGS. 5–11 in which the erase beam leads the image beam by a distance d (FIG. 2) of a few regions 44 in the same horizontal scan path, the erase beam 52 of the assembly 128 leads the image beam or beams by at least one horizontal scan line. Therefore, the assembly 128 need not activate and deactivate the erase beam 52 after each horizontal scan like the bidirectional assemblies 120 and 124 (FIGS. 10–11).

The scanning assembly 128 includes a single mirror assembly 86 for bidirectionally scanning one or more image beams—two image beams 42a and 42b in the illustrated embodiment—and an erase beam 52, and includes a beam generator 130 for generating these beams. The erase beam 52 is at least one horizontal scan line ahead of the closest image beam 42b, typically far enough ahead so that it does not interfere with the beam 42b. More specifically, the mirror 90 scans the beams 42a, 42b, and 52 across the screen 34 while it pivots horizontally from left to right and from right to left. Because the mirror 90 scans the image onto the screen 34 in both horizontal directions, raster pinch, which is discussed above in conjunction with e.g., FIG. 11, may be a problem. Therefore, to reduce or eliminate the problems associated with raster pinch, in the illustrated embodiment the mirror 90 over scans the image beams 42a and 42b past both the left and right edges of the screen 34.

Still referring to FIG. 12, in operation the mirror 90 begins scanning the beam 52 at the top of the screen 34 to erase the first horizontal scan line or lines, and then continues to scan the beams 42a, 42b, and 52 downward and across the screen 34 from left to right and from right to left. The beam generator 130 activates the beams 42a, 42b, and 52 and directs them to the incidence point 96 during both the left-to-right and right-to-left scans. Once the mirror 90 reaches its bottommost position, it begins pivoting toward its top position. During this upward pivot, the generator 130 deactivates the beams 42a, 42b, and 52, and then activates them again during the downward pivot. Or, the generator 130 may deactivate the beam 52 and generate another erase beam 52 (not shown) on top of the beams 42a and 42b so that the reflector 36 can bidirectionally scan the image as described above during the upward pivot. This allows the mirror 90 to scan the image during both the top-to-bottom and bottom-to-top pivots. Alternatively, the mirror 90 may scan the image during its bottom-to-top pivot only.

Alternative embodiments of the scanning assembly 128 are contemplated. For example, one can modify the assembly 128 to have more or fewer than two image beams 42. By adding additional image beams 42, one can increase the resolution of the image generated by the assembly 128 without increasing the horizontal scan rate of the mirror 90. One can also modify the assembly 128 to implement the tiling techniques of FIGS. 8 and 9 or to implement the scanning technique of FIG. 10. In addition one can modify the assembly 128 according to the technique of FIG. 7 by replacing the narrow erase beam 52 with a wide erase beam. Furthermore, instead of using the erase beam 52, one can simultaneously erase an entire line or lines of the screen 34 with an array of erase-energy generators such as organic light-emitting devices (OLEDs). For example, the array can have rows of OLEDs, each row aligned with a respective line of the screen 34. To erase a line, one activates the corresponding row of OLEDs for a predetermined time. OLEDs are discussed in U.S. Pat. No. 5,929,562, entitled "Organic Light-Emitting Devices", which is assigned to Cambridge Display Technology Ltd. and which is incorporated by reference.

Figure 13:
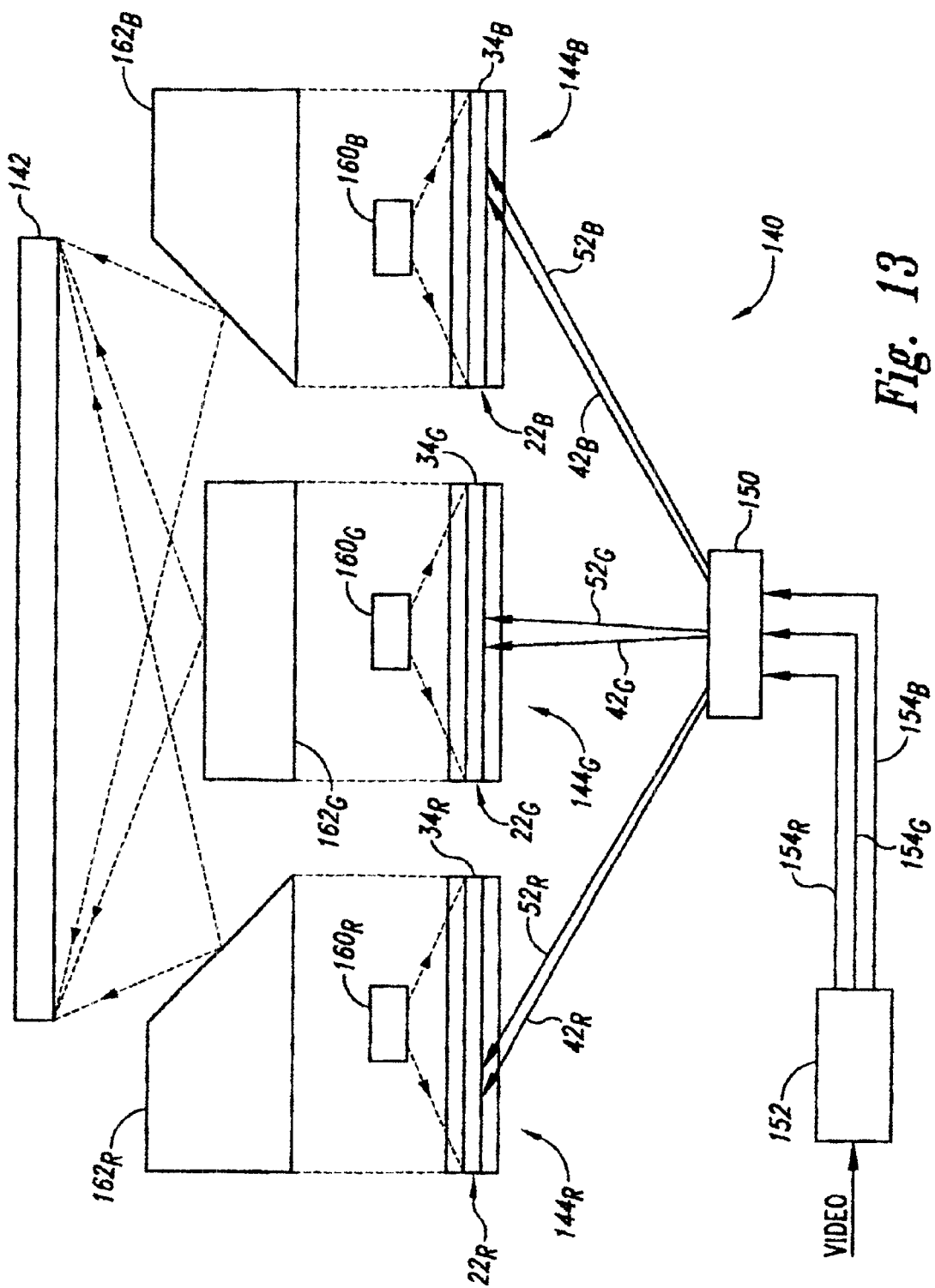
FIG. 13 is a top view of a color-image projection system according to an embodiment of the invention.

FIG. 13 is a top view of a color-image projection system 140 according to an embodiment of the invention. The system 140 often generates a higher-quality image and is often less expensive, less complex, and more energy efficient than conventional image projections systems such as conventional projection television sets. Furthermore, although the system 140 is described as receiving and displaying video frames, the system can receive and display still images as well.

The system 140 includes a conventional display screen 142 for displaying a color image, red, green, and blue image projectors $144_R$, $144_G$, and $144_B$, a scanning assembly 150 for scanning red, green, and blue portions of the image, and an electro/optical converter 152 for respectively converting an electronic video signal into red, green, and blue optical scanning signals $154_R$, $154_G$, and $154_B$.

Each of the red, green, and blue image projectors $144_R$, $144_G$, and $144_B$ includes a respective image amplifier $22_R$, $22_G$, and $22_B$, a respective colored illumination source $160_R$, $160_G$, and $160_B$, and a respective optical assembly $162_R$, $162_G$, and $162_B$. The image amplifiers $22_R$, $22_G$, and $22_B$ respectively include projection screens $34_R$, $34_G$, and $34_B$ and are otherwise similar to the image amplifiers 22 of FIGS. 1–12. The illumination sources $160_R$, $160_G$, and $160_B$ respectively illuminate the screens $34_R$, $34_G$, and $34_B$ with red, green, and blue light and are otherwise similar to the illumination source 24 (FIG. 1–3). The optical assemblies $162_R$, $162_G$, and $162_B$ respectively receive the projected red, green, and blue image portions from the screens $34_R$, $34_G$, and $34_B$ and redirect these projected image portions onto the screen 142 to produce a color image. In one embodiment, the optical assemblies $162_R$, $162_G$, and $162_B$ magnify the red, green, and blue image portions so that displayed image has desired dimensions. Because one can construct the optical assemblies $162_R$, $162_G$, and $162_B$ according to conventional techniques, the details of their structure and operation are omitted for brevity.

The scanning assembly 150 respectively scans the red, green, and blue portions of the image onto the screens $34_R$, $34_G$, and $34_B$ according to any one of or a combination of the scanning techniques and assemblies discussed above in conjunction with FIGS. 5–12. For clarity, the described embodiment of the assembly 150 scans image beams $42_R$, $42_G$, and $42_B$ and erase beams $52_R$, $52_G$, and $52_B$ according to the unidirectional scanning technique discussed above in conjunction with FIG. 5. For example, the assembly 150 scans the beams $42_R$ and $52_R$ to generate on the screen $34_R$ the image pixels that have a red component to them.

Likewise, the assembly 150 scans the beams $42_G$ and $52_G$ to generate on the screen $34_G$ the image pixels that have a green component to them, and scans the beams $42_B$ and $52_B$ to generate on the screen $34_B$ the image pixels that have a blue component to them. In one embodiment, the assembly 150 respectively uses the optical signals $154_R$, $154_G$, and $154_B$ as the image beams $42_R$, $42_G$, and $42_B$. In other embodiments, the assembly 150 conventionally converts the signals $154_R$, $154_G$, and $154_B$ into the beams $42_R$, $42_G$, and $42_B$, respectively.

The converter 152 is a conventional circuit for converting the conventional composite video signal into the red, green, and blue optical signals $154_R$, $154_G$, and $154_B$. For example, the circuit 152 can separate the video signal into its red, green, and blue components, and then, using lasers or laser diodes, convert the red, green, and blue components into the red, green, and blue optical signals $154_R$, $154_G$, and $154_B$. Because the image amplifiers $22_R$, $22_G$, and $22_B$ are monochrome amplifiers that are respectively illuminated with red, green, and blue light, neither the optical signals $154_R$, $154_G$, and $154_B$ nor the image beams $42_R$, $42_G$, and $42_B$ need be colored.

Still referring to FIG. 13, in operation of the projection system 140, the electro/optic signal converter 152 converts the received video signal into red, green, and blue optical signals $154_R$, $154_G$, and $154_B$. The scanning assembly 150 converts these optical signals into the respective image beams $42_R$, $42_G$, and $42_B$, generates the erase beams $52_R$, $52_G$, and $52_B$, and scans these beams across the screens $34_R$, $34_G$, and $34_B$ to generate the respective red, green, and blue portions of the image. The illumination sources $160_R$, $160_G$, and $160_B$ respectively illuminate the screens $34_R$, $34_G$, and $34_B$ with red, green, and blue light such that these screens project the red, green, and blue image portions in their respective colors. The optical assemblies $162_R$, $162_G$, and $162_B$ respectively receive these projected color image portions and redirect them such that they are aligned, and thus form the color image, on the display screen 142. A viewer (not shown) can then view the color image on the screen 142. In one embodiment, a viewer views the color image from the front side—the side facing away from the optical assemblies 162—of the screen 142.

Alternative embodiments of the projection system 140 are contemplated. For example, the system 140 can be constructed so that a viewer views the image from the back side—the side facing the optical assemblies 162—of the screen 142. Alternatively, the illumination sources 160, the optical assemblies 162 and the screen 142 may be located on the same side of the image amplifiers 22 as the scanning assembly 150, and the viewer may view the image from either side of the screen 142. Furthermore, although the image amplifiers $22_R$, $22_G$, and $22_B$ are shown as being separate and laterally spaced apart from one another, they may be separate but contiguous with one another. Or, the image amplifiers $22_R$, $22_G$, and $22_B$ may each compose a respective portion of a single piece. For example, the image amplifiers $22_R$, $22_G$, and $22_B$ may compose respective portions of a single image amplifier (not shown).

Figure 14:
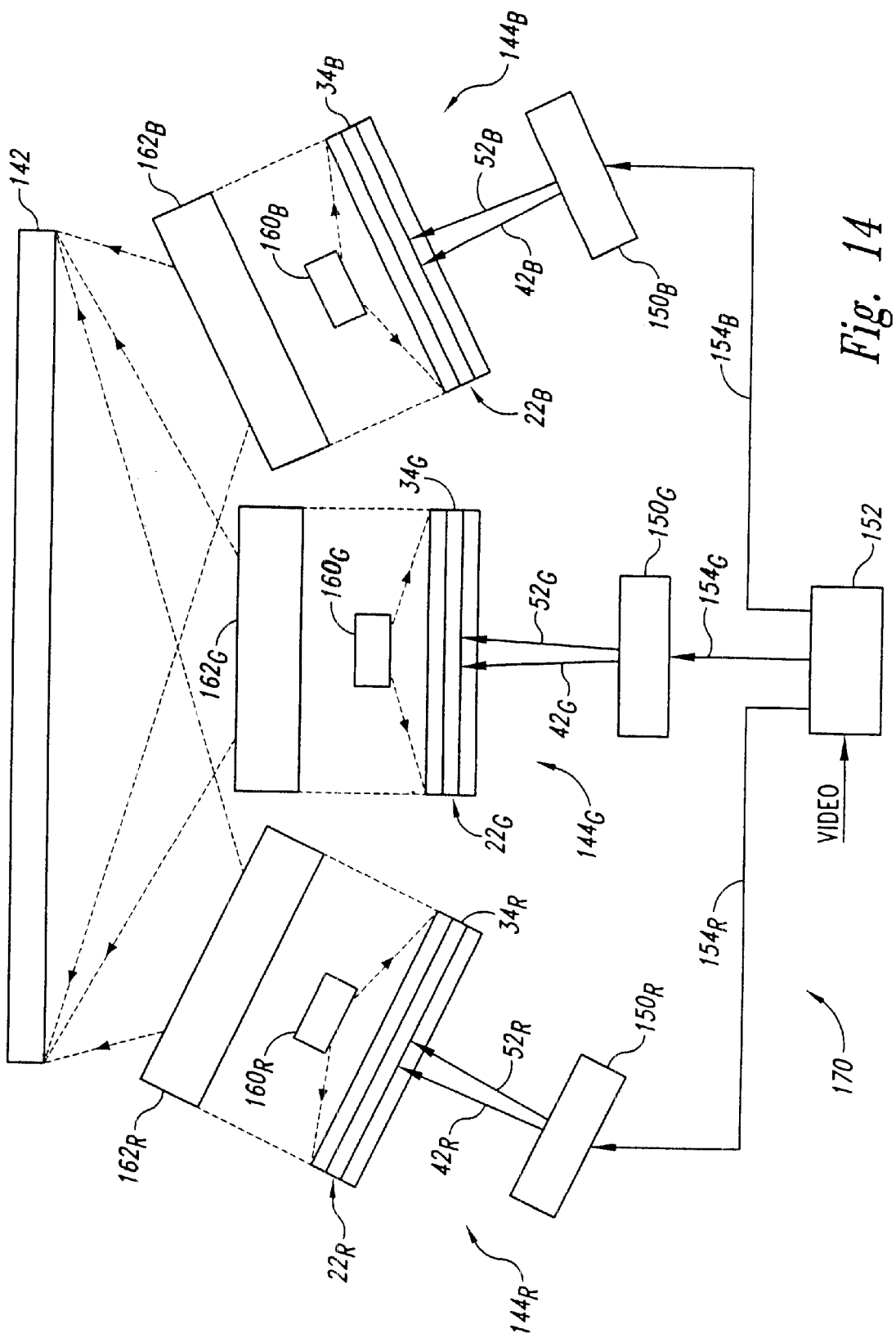
FIG. 14 is a top view of a color-image projection system according to another embodiment of the invention.

FIG. 14 is a top view of a color-image projection system 170 according to an embodiment of the invention. The system 170 is similar to the system 140 of FIG. 13 except that 1) the image projectors $144_R$ and $144_B$ are angled more toward the screen 142 and 2) separate scanning assemblies $150_R$, $150_G$, and $150_B$ respectively scan the red, green, and blue image portions onto the screens $34_R$, $34_G$, and $34_B$. Alternatively, the system 170 may include a central scanning assembly 150 like the system 140 does. Furthermore, because the screens $34_R$ and $34_B$ of the system 170 have different angles with respect to the display screen 142 as compared to the screens $34_R$ and $34_B$ of the system 140, the optical assemblies $162_R$ and $162_B$ of the system 170 may be different than the optical assemblies $162_R$ and $162_B$ of the system 150.

In operation, the projection system 170 operates in a manner that is similar to that described above for the projection system 140 of FIG. 13.

Alternative embodiments of the projection system 170 are contemplated. For example, the system 170 can be constructed so that a viewer views the image from the back side—the side facing the optical assemblies 162—of the screen 142. Alternatively, the illumination sources 160, the optical assemblies 162, and the screen 142 may be located on the same side of the image amplifiers 22 as the scanning assembly 150, and the viewer may view the image from either side of the screen 142. Furthermore, although the image amplifiers $22_R$, $22_G$, and $22_B$ are shown as being separate and laterally spaced apart from one another, they may be separate but contiguous with one another. Or, the image amplifiers $22_R$, $22_G$, and $22_B$ may each compose a respective portion of a single piece. For example, the image amplifiers $22_R$, $22_G$, and $22_B$ may compose respective portions of a single image amplifier (not shown).

Referring to FIGS. 13 and 14, one can modify the projection systems 140 and 170 so that a viewer can view an image directly instead of viewing the image on the screen 142. For example, one can modify the construction and positions of the optical assemblies 162, and insert an X cube (not shown) between the assemblies 162 and the viewer's eye (not shown). The X cube, which is generally four conventional prisms arranged to form a cube, combines the color image portions from the assemblies 162 into a viewable color image, and directs the image into the viewer's eye. The screen 142 may be omitted from such a direct-view system. Other alternatives exist for converting the projection systems 140 and 170 into direct-view systems. The details for converting the projections systems 140 and 170 into direct-view systems are known. Therefore, such details are omitted for brevity.

From the foregoing it will be appreciated that, although specific embodiments of the invention have been described herein for purposes of illustration, various modifications may be made without deviating from the spirit and scope of the invention.

We claim:

1. An image system, comprising:
   a screen having spatially discrete first and second regions with adjustable brightness levels; and
   a beam generator operable to direct first and second electromagnetic off beams and first and second electromagnetic on beams onto the first and second regions, respectively, the first and second off beams respectively operable to change the brightness levels of the first and second regions according to a first polarity, and the first and second on beams operable to change the brightness levels of the first and second regions according to a second polarity.

2. The image system of claim 1 wherein the beam generator is operable to direct the first and second off beams onto the first and second regions, respectively, before directing the first and second on beams onto the first and second regions, respectively.

3. The image system of claim 1 wherein:
   the first off beam has a different wave length than the first and second on beams; and
   the second off beam has a different wave length than the first and second on beams.

4. The image system of claim 1 wherein:
   the first and second on beams are operable to increase the brightness levels of the first and second regions, respectively; and the first and second off beams are operable to decrease the brightness levels of the first and second regions, respectively.

5. The image system of claim 1, further comprising an illuminator operable to illuminate the screen.

6. An image system, comprising:

a screen having first and second sections, each section having respective multiple regions with adjustable brightness levels; and an image generator operable to respectively generate first and second portions of an image on the first and second sections of the screen by directing first and second electromagnetic off beams and first and second electromagnetic on beams onto the first and second sections, respectively, the first and second off beams respectively operable to change the brightness levels of the regions in the first and second sections according to a first polarity and the first and second on beams operable to change the brightness levels of the regions in the first and second sections according to a second polarity.

7. The image system of claim 6, further comprising an illuminator operable to illuminate the first and second sections of the screen.

8. An image system, comprising:

first and second screens each having respective regions with adjustable brightness levels; and an image generator operable to respectively generate first and second portions of an image on the first and second screens by directing first and second electromagnetic off beams and first and second electromagnetic on beams onto the first and second screens, respectively, the first and second off beams respectively operable to change the brightness levels of the regions of the first and second screens in a first direction and the first and second on beams operable to change the brightness levels of the regions of the first and second screens in a second direction that is opposite to the first direction.

9. The image system of claim 8, further comprising an illuminator operable to illuminate the first and second screens.

10. The image system of claim 8 wherein the beam generator is operable to:

scan the first off and on beams back and forth across the first screen; and scan the second off and on beams back and forth across the second screen.

11. A method, comprising:

directing a first electromagnetic off beam onto a first region of a screen to change the brightness level of the first region in a first off direction;

directing a second electromagnetic off beam onto a second region of the screen to change the brightness level of the second region in a second off direction;

directing a first electromagnetic on beam onto the first region to change the brightness level of the first region in a first on direction; and directing a second electromagnetic on beam onto the second region to change the brightness level of the second region in a second on direction.

12. The method of claim 11, further comprising:

directing the first off beam onto the first region of the screen before directing the first on beam onto the first region; and directing the second off beam onto the second region of the screen before directing the second on beam onto the second region.

13. The method of claim 11 wherein:

directing the first off beam comprises directing the first off beam onto the first region to change the reflectivity of the first region in the first off direction;

directing the second off beam comprises directing the second off beam onto the second region to change the reflectivity of the second region in the second off direction;

directing the first on beam comprises directing the first on beam onto the first region to change the reflectivity of the first region in the first on direction; and directing the second on beam comprises directing the second on beam onto the second region to change the reflectivity of the second region in the second on direction.

14. The method of claim 11, further comprising illuminating the first and second regions of the screen.

15. A method, comprising:

directing a first electromagnetic off beam onto a first screen to change the brightness levels of multiple first regions of the first screen in a first off direction;

directing a second electromagnetic off beam onto a second screen to change the brightness levels of multiple second regions of the second screen in a second off direction;

directing a first electromagnetic on beam onto the first screen to change the brightness levels of the first regions in a first on direction; and directing a second electromagnetic on beam onto the second screen to change the brightness levels of the second regions in a second on direction.

16. The method of claim 15, further comprising illuminating the first and second screens.

17. The method of claim 15 wherein:

directing the first off and on beams comprises scanning the first off and on beams back and forth across the first screen; and directing the second off and on beams comprises scanning the second off and on beams back and forth across the second screen.

* * * * *